(12) United States Patent
Presniakov et al.

(10) Patent No.: US 11,703,721 B2
(45) Date of Patent: Jul. 18, 2023

(54) LIQUID CRYSTAL BEAM CONTROL DEVICE

(71) Applicant: LensVector Inc., Sunnyvale, CA (US)

(72) Inventors: Vladimir Presniakov, Quebec (CA); Karen Asatryan, Quebec (CA); Armen Zohrabyan, Quebec (CA); Tigran Galstian, Quebec (CA); Aram Bagramyan, Quebec (CA); Simon Careau, Quebec (CA)

( * ) Notice: Subject to any disclaimer, the term of this patent is extended or adjusted under 35 U.S.C. 154(b) by 0 days.

(21) Appl. No.: 16/151,761

(22) Filed: Oct. 4, 2018

(65) Prior Publication Data

US 2019/0033669 A1 Jan. 31, 2019

Related U.S. Application Data

(63) Continuation of application No. 15/913,181, filed on Mar. 6, 2018, now Pat. No. 10,126,607, which is a continuation-in-part of application No. PCT/CA2016/050589, filed on May 25, 2016.

(60) Provisional application No. 62/487,603, filed on Apr. 20, 2017, provisional application No. 62/242,422, filed on Oct. 16, 2015, provisional application No. 62/217,875, filed on Sep. 12, 2015.

(51) Int. Cl.
*G02F 1/1343* (2006.01)
*G02F 1/1337* (2006.01)
*G02F 1/29* (2006.01)
*G02F 1/1347* (2006.01)

(52) U.S. Cl.
CPC ...... *G02F 1/134309* (2013.01); *G02F 1/1337* (2013.01); *G02F 1/13471* (2013.01); *G02F 1/134363* (2013.01); *G02F 1/29* (2013.01); *G02F 1/133738* (2021.01); *G02F 1/133742* (2021.01); *G02F 1/134381* (2021.01); *G02F 2203/26* (2013.01); *G02F 2203/50* (2013.01)

(58) Field of Classification Search
CPC .............................. G02F 1/29; G02F 1/13471
See application file for complete search history.

(56) References Cited

U.S. PATENT DOCUMENTS

| 6,005,650 | A | 12/1999 | Kim et al. | |
|---|---|---|---|---|
| 11,221,539 | B2 * | 1/2022 | Galstian | F21V 14/003 |
| 2003/0001993 | A1 | 1/2003 | Iijima | |
| 2005/0140905 | A1 | 6/2005 | Yang | |

(Continued)

FOREIGN PATENT DOCUMENTS

| CN | 101675379 A | 3/2010 |
|---|---|---|
| CN | 101055400 B | 12/2011 |

(Continued)

OTHER PUBLICATIONS

Chinese application No. 201680050049.5 office action dated Jan. 10, 2020.

(Continued)

*Primary Examiner* — Alexander P Gross

(57) ABSTRACT

Liquid crystal light beam control devices and their manufacture are described. Beneficial aspects of beam broadening devices employed for controlled illumination and architectural purposes are presented including improving beam divergence control, improving beam broadening dynamic range control, beam divergence preconditioning, improving projected beam intensity uniformity.

20 Claims, 26 Drawing Sheets

(56) References Cited

U.S. PATENT DOCUMENTS

| | | | |
|---|---|---|---|
| 2007/0076150 A1 | 4/2007 | Hale et al. | |
| 2007/0077372 A1 | 4/2007 | Chung | |
| 2008/0198280 A1 | 8/2008 | Hikmet et al. | |
| 2008/0205075 A1 | 8/2008 | Hikmet et al. | |
| 2008/0284924 A1 | 11/2008 | Hofmann et al. | |
| 2010/0148688 A1 | 6/2010 | Hikmet et al. | |
| 2010/0149444 A1* | 6/2010 | Hikmet | G02F 1/29 349/15 |
| 2010/0208185 A1 | 8/2010 | Bommel et al. | |
| 2010/0221459 A1 | 9/2010 | Chung | |
| 2014/0125934 A1* | 5/2014 | Naganuma | H04N 13/305 349/123 |
| 2015/0153580 A1 | 6/2015 | Fang | |
| 2015/0268495 A1 | 9/2015 | Kizaki et al. | |
| 2015/0316820 A1 | 11/2015 | Duston et al. | |
| 2016/0041449 A1 | 2/2016 | Clark et al. | |
| 2016/0252235 A1 | 9/2016 | Benner et al. | |
| 2017/0269453 A1 | 9/2017 | Galstian et al. | |

FOREIGN PATENT DOCUMENTS

| | | |
|---|---|---|
| CN | 204188912 U | 3/2015 |
| DE | 19829226 A1 | 1/1999 |
| JP | 3432293 B2 | 8/2003 |
| TW | 200722871 A | 6/2007 |
| WO | 2014105814 A1 | 7/2014 |
| WO | 2014138974 A1 | 9/2014 |
| WO | 2017/041167 A1 | 3/2017 |
| WO | 2018/053640 A1 | 3/2018 |

OTHER PUBLICATIONS

European application No. 16843322.5 supplementary partial search report dated Jul. 17, 2019.
International application No. PCT/CA2016/050589 International Preliminary Report on Patentability Chapter I dated Mar. 13, 2018.
International application No. PCT/CA2016/050589 International Search Report dated Sep. 14, 2016.
International application No. PCT/CA2016/050589 Written Opinion of the International Searching Authority dated Sep. 14, 2016.
International application No. PCT/CA2017/051117 International Preliminary Report on Patentability Chapter I dated Mar. 26, 2019.
International application No. PCT/CA2017/051117 International Search Report dated Jan. 15, 2018.
International application No. PCT/CA2017/051117 Search Strategy dated Jan. 15, 2018.
International application No. PCT/CA2017/051117 Written Opinion of the International Searching Authority dated Jan. 15, 2018.
Taiwan application No. 105129479 office action dated Oct. 17, 2019.
U.S. Appl. No. 15/757,471 office action dated Oct. 2, 2019.
International application No. PCT/CA2016/050589 Search Strategy dated Sep. 14, 2016.
Related European patent application No. 16843322.5 European examination report dated Jun. 19, 2020.
Related Chinese application No. 201680050049.5 office action dated Mar. 16, 2021 and the brief translation.
Related Chinese application No. 201680050049.5 office action dated Sep. 1, 2020 and the brief translation.
Related International application No. PCT/CA2018/050472 International Preliminary Report on Patentability Chapter I dated Oct. 22, 2019.
Related International application No. PCT/CA2018/050472 International Search Report dated Jul. 27, 2018.
Related International application No. PCT/CA2018/050472 Written Opinion of the International Searching Authority dated Jul. 27, 2018.
Related European patent application No. 18787815.2 extended European search report dated Dec. 9, 2020.
Related U.S. Appl. No. 16/334,059 Office Action dated May 15, 2020.
Related U.S. Appl. No. 16/334,059 Office Action dated Dec. 10, 2020.
Related U.S. Appl. No. 16/334,059 Office Action dated Apr. 22, 2021.

* cited by examiner

LIQUID CRYSTAL BEAM CONTROL DEVICE

RELATED APPLICATIONS

This patent application is continuation of U.S. Ser. No. 15/913,181, filed Mar. 6, 2018, now U.S. Pat. No. 10,126,607 which is, a continuation-in-part of PCT/CA2016/050589 filed May 25, 2016 that claims priority from U.S. Provisional Patent Application Ser. No. 5 62/217,875 filed Sep. 12, 2015 and from U.S. Provisional Patent Application Ser. No. 62/242,422 filed Oct. 16, 2015, the entireties of which are incorporated herein by reference. U.S. Ser. No. 15/913,181 also claims priority of U.S. Provisional Patent Application Ser. No. 62/487,603 filed Apr. 20, 2017, the entirety of which is incorporated herein by reference.

TECHNICAL FIELD

This patent application relates to liquid crystal (LC) beam control devices and their manufacturing.

BACKGROUND

Liquid crystal beam control devices are known in the art. Some such devices typically use patterned electrodes over an LC cell to create a spatial variation in the index of refraction that is useful to control a beam. To keep voltages low, electrodes can be placed on cell substrates on an inner side or sides thereof. To increase optical performance, the (form factor) size and/or aspect ratio of beam (control) shaping elements, defined mainly by the ratio of the patterned electrodes pitch and the thickness of the LC, should be carefully chosen. Various problems exist, including: a limited degree (extent) of angular control, poor (quality) beam intensity distribution, excessive color separation, high cost of manufacture, unsuitable operation voltage, etc.

However, now specific applications are emerging that might benefit from such elements. There are many examples of such applications, which may be qualified as "dynamic" or "smart" lighting. For example, Light Emitting Diode (LED) sources (with relatively small divergence and emitting surface) are increasingly used in the architectural lighting, automotive industry, etc., but in the large majority of cases the parameters of those illumination systems (such as diffusion, divergence, glares, direction, etc.) are fixed. At the same time, it might be extremely useful, for example, to have a lighting system that might change the divergence angle of the LED illumination system automatically when there is a car moving in the opposed direction (to avoid disturbing its driver). Other examples may be mentioned for optimized residential or general architectural lighting. In addition, with the penetration of Li-Fi technologies (replacing the Wi-Fi by smart LED sources) the ability to controllably steer or broaden light (used both for illumination and connectivity) may be very useful. This is a reason why LC beam control devices become increasingly important.

Usually the efficiency of beam shaping in LCs is defined, first of all, by the optical path difference (or the phase delay $\delta\phi = L \cdot \delta n \cdot 2\pi/\lambda$, where L is the effective thickness, $\delta n$ is the electrically induced refractive index difference and $\lambda$ is the light wavelength in vacuum) undergone by light traversing the LC layer. This difference is limited by the maximal values of optical birefringence $\Delta n$ ($\delta n < \Delta n$) and the thickness L of the LC. The beam shaping efficiency is also inversely proportional to the clear aperture (CA) of the element that is defined by the gap g between various electrode segments. In addition, the non-locality of the electric field distribution (fringing field, etc.) as well as of the reaction of the LC (to that electric field) impose limitations on the choice of the geometrical factors of the cell. Thus, the ratio $r = \delta\phi/CA$ is one (among others) important factor (it contains also the aspect ratio L/CA or L/g). That is the reason why the thickness of the LC layer and the gaps g must be chosen in a way to increase the efficiency of beam shaping (for example, large LC thickness values L usually increase the value of $\delta\phi$, but too large of a thickness L combined with too small of a gap g between electrodes will not generate strong modulation depth. On the other hand, too large of a gap g for a small of a thickness L also will reduce the modulation efficiency). That is why an optimized choice of the ratio r is desired for each application. Once the right value of r is found, multiple such segments may be combined to "fill" the clear aperture of larger beam shaping devices. Finally, given the strong anisotropic character of LCs, the propagation of light in LCs is often accompanied by dramatic transformations of light polarization. This is the reason why it is very important to understand those transformations and to design carefully the electro optic cell (electrodes, gaps, thicknesses of the cell, etc.) to obtain the desired beam shaping. One application of such beam shaping devices is for lighting in which the light from a light source, such as a beam from an LED light source, can be modulated from a spot beam to a slit or fan beam and/or to a broad flood beam.

SUMMARY

Applicant has discovered a number of characteristics related to the optical performance of beam shaping LC devices.

In some embodiments, there is provided an LC beam broadening device comprising a first LC sandwich having LC material contained within opposed front and back first substrates to have a homeotropic ground state orientation, the front and the back first substrates each having an arrangement of parallel electrode segments, wherein the segments on the front first substrate extend orthogonally to the segments on the back first substrate; and a second LC sandwich having LC material contained within opposed front and back second substrates to have a homeotropic ground state orientation, the front and the back second substrates each having an arrangement of parallel electrode segments, wherein the segments on the front second substrate extend orthogonally to the segments on the back second substrate.

In some of these embodiments, the electrodes between the first sandwich and the second sandwich are arranged to be rotated or twisted by between about 2 degrees to about 6 degrees from each other. This has been found to reduce significantly the fluctuations in the spatial intensity distribution of transmitted (thought the beam shaping device) light, including high intensity spots and lines.

In some of these embodiments, the number of LC sandwiches is three or more. It has been shown that four sandwiches in which the electrode orientation between two of the sandwiches and the other two sandwiches is at 45 degrees works well to provide good beam broadening, while reducing the spatial fluctuations of transmitted light intensity, including high intensity spots and lines.

The electrode pattern can be variable, segmented and oriented differently over the aperture and not only a single parallel linear pattern.

Applicant has further discovered that color separation in a liquid crystal beam control device is dependent of in-plane liquid crystal molecular alignment orientation component with respect to the in-plane orientation of the (patterned) strip electrodes. Liquid crystal molecules have a molecular (major) axis. LC molecular alignment means can be employed in a LC cell to induce at least an initial ground state molecular alignment. Preferably a uniform ground state molecular alignment is desired to provide a coordinated operation of the LC material over the cell or effective device aperture. The general ground state molecular alignment direction, also referred to as a director, can be decomposed along x, y and z; "in-plane molecular alignment" as employed herein refers to the x, y director orientation disregarding the z component parallel to the propagation direction of the light beam through the beam control device. More specifically, when the in-plane LC alignment is oriented across the separation gap between strip (patterned) electrodes substantially perpendicularly to the strip electrodes, color separation in the output beam is much greater than when the in-plane LC alignment is at an angle, such as between about 45 degrees to about 0 degrees, namely substantially parallel to the (patterned) strip electrodes.

In some embodiments the beam control device is arranged for said initial beam to enter a first one of said at least one liquid crystal cell by one of said substrates having said pattern of paired electrodes thereon, and said alignment layer provides an in-plane liquid crystal ground state alignment.

In some embodiments said alignment layer provides in-plane liquid crystal alignment having an alignment direction that is between about 45 degrees to 0 degrees with respect to an orientation of said electrodes in said electrode pairs.

In some embodiments at least a pair of alignment layers, each said alignment layer orienting said liquid crystal director with negative and positive pre-tilt out-of-plane angle on said opposed substrates, said patterned electrode structure being provided on both cell substrates and the beam control device performing in a symmetric manner irrespective of the substrate receiving said incident beam.

In some embodiments said alignment layer provides in-plane liquid crystal alignment having an alignment direction that is about 45 degrees with respect to the orientation of said electrode pairs, and four of said liquid crystal cells are combined to provide modulation of both polarizations and in two directions or azimuthal planes.

In some embodiments at least two of said liquid crystal cells combined to provide output beam modulation in two directions or azimuthal planes, said beam control device is arranged such that said incident light beam enters a first one of said liquid crystal cells by one of said substrates having said patterned electrode structure thereon, said alignment layer of said first liquid crystal cell provides in-plane liquid crystal alignment, said beam control device is arranged for said beam output by said first liquid crystal cell to enter said second one of said liquid crystal cells by one of said substrates without said patterned electrode structure, said alignment layer of said second liquid crystal cell provides homeotropic liquid crystal alignment.

BRIEF DESCRIPTION OF THE DRAWINGS

The embodiments will be better understood by way of the following detailed description with reference to the appended drawings, in which:

in FIG. 4A all electrodes receive a drive signal having 5V in the same phase whereas in FIG. 4B all electrodes receive corresponding drive signals having 5V but their phases are changing to 0, 180, 90, 270 degrees respectively, in accordance with an embodiment of the proposed solution;

FIG. 5 illustrates a 3D schematic view of one beam control device element while FIG. 6 shows across sectional view of 3 adjacent elements arranged in accordance with an embodiment of the proposed solution;

Figure 1:
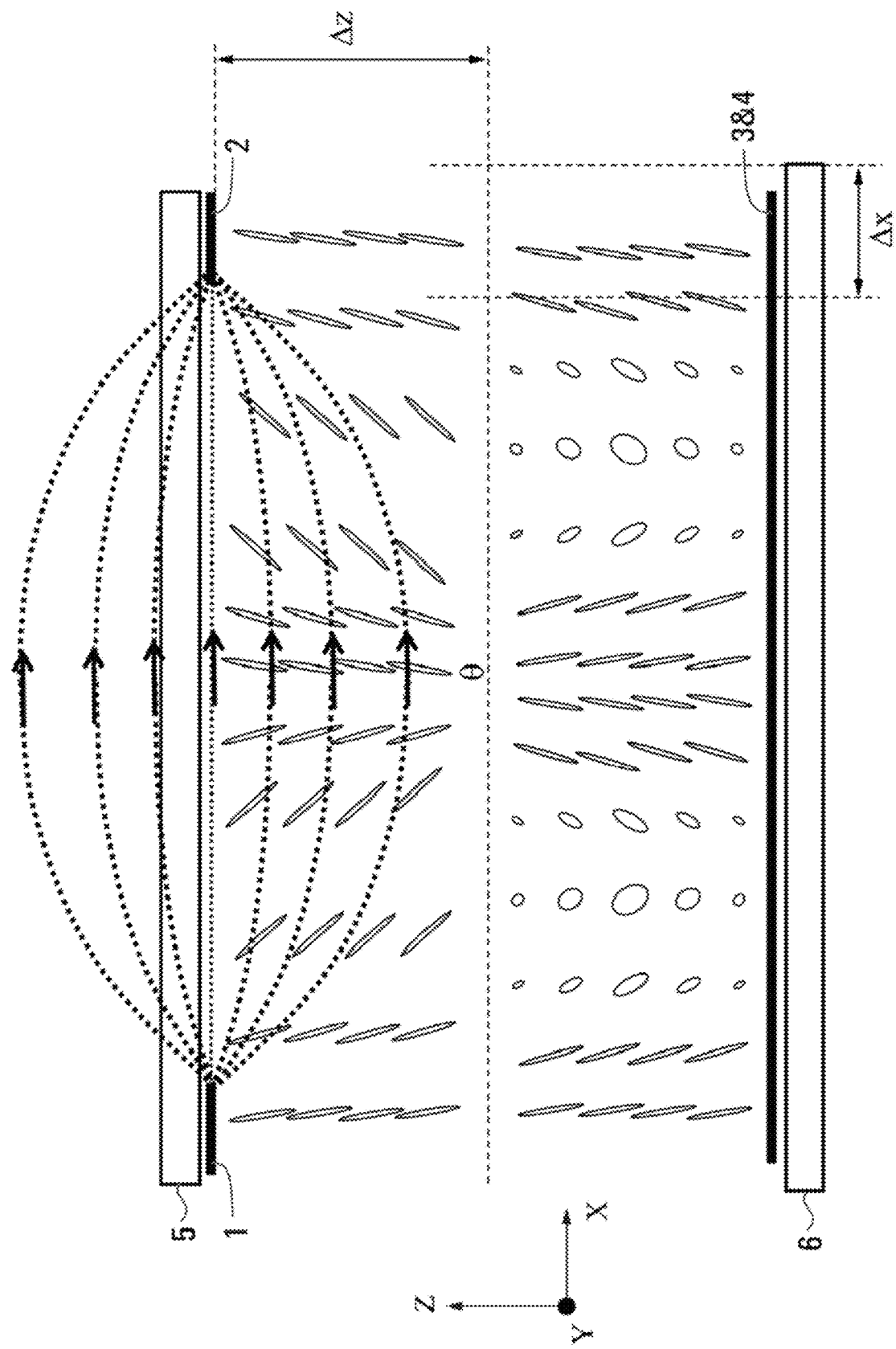
FIG. 1 is a schematic (qualitative) illustration of an operation mode that enables broadening and polarization transformation (mainly rotation) when both electrode layers (on opposed front and back first substrates) are activated in accordance with an embodiment of the proposed solution.

While the layer sequence described is of significance, reference to "top", "bottom", "front" and "rear" qualifiers in the present specification is made solely with reference to the orientation of the drawings as presented in the application and do not imply any absolute spatial orientation.

DETAILED DESCRIPTION

The beam control devices described here are optical devices which control the output beam of light either with respect to the beam divergence or with respect to the beam propagation direction (steering). Controlled beam divergence/convergence is a special case of beam control providing beam focusing/defocusing. Beam direction control can be employed for beam steering purposes. Beam control devices which provide a combination of beam diffusion, beam divergence/convergence or beam direction control are generally referred to herein as beam shaping devices.

In LC beam control devices, an electric field is typically used to control a molecular orientation of LC material in a LC cell. The electric field can be modulated in time and spatially over the aperture of a LC optical device to spatially modulate the local orientation of LC molecules. The change in molecular orientation affects the local index of refraction of the LC material and can create a refractive index gradient in the LC material throughout the LC cell volume. In a particular case, particular refractive index gradient variations can create what is known as gradient index (GRIN) focusing or defocusing lensing. For imaging lenses, it can be desirable to have a (controlled) smooth variation of LC molecular orientation over the aperture, without using numerous lens elements to form a lens of an extended aperture.

When the aperture of the beam control device is large, beam broadening and steering at large angles is difficult with a LC GRIN device due to relatively small variations in the index of refraction typically provided over the single aperture. By using a number of beam control elements having small active apertures over an effective larger aperture, smaller optical elements with a smaller aspect ratio (form factor) can provide greater overall beam broadening and steering ability. In the case of beam shaping devices, the use of a number of elements can be desirable and the profile of the electric field over the small aperture area of each beam shaping element and its interaction with the adjacent (shared) LC layer can be different from that of larger aperture devices. In some implementations of the proposed solution, employing an appropriate form factor beam device elements can provide improved beam shaping, for example beam broadening.

In some beam control devices, the controlling electric field is provided using electrodes arranged on opposed sides of the LC layer, and in others, the electric field is provided by electrodes arranged on a single one substrate adjacent (containing/sandwiching) the LC layer.

Nematic LC (NLC), when oriented in a ground state using a rubbed alignment layer (for in plane alignment), can mainly affect only one polarization component of incident unpolarized light. To modulate unpolarized light, two layers of LC, with orthogonally oriented molecular orientation, are commonly used. Natural or unpolarized light may be split (represented) into two orthogonal polarizations, only one of the polarizations will be modulated by the first LC layer (in accordance with its LC spatial modulation), while the other polarization component will essentially be unmodulated by that LC layer. The second LC layer arranged to provide the desired complementary modulation on the polarization unmodulated by the first LC layer, lets the polarization modulated by the first LC layer pass through with little or negligible modulation.

Applicant has discovered a phenomenon of dynamic (electric field induced) polarization rotation that helps creating a simple (single cell) LC device that can broaden light in two perpendicular planes.

FIG. 1 describes very schematically the cross section of an LC cell (sandwich) of an idealized geometry where both pairs of parallel electrodes (1 and 2 on top substrate 5 and 3 and 4 on bottom substrate 6) are activated simultaneously with a relative phase shift of 180 degrees. Instead of simultaneous activation of the two electrode arrangements, it is possible to alternate or time multiplex between activation of the upper and lower electrode pair arrangements.

It is important to mention that the molecular orientation pattern is illustrated in FIG. 1 only to demonstrate qualitatively the concept of light broadening with polarization rotation and transformation. In no way this is a limiting description. In this geometry, the molecular orientations that are immediately close to the internal surfaces of both substrates 5 and 6 will remain in the ground state (homeotropic) when strong anchoring conditions are present (not described here). The homeotropic alignment will remain the same also in the immediate vicinity (below) of each electrode 1, 2, 3 and 4 since the horizontal (or parallel to the substrates) components of electric fields are negligible in those areas (see extreme left and right columns of LC molecules). The situation may be similar in the center of the LC cell at least for low to moderate strength electric fields. However, the homeotropic alignment will be greatly perturbed in other zones. Namely, the main (not all) reorientation of molecules in the upper zone (delimited by the horizontal dashed line at $\Delta z$, between electrodes 1 and 2) will be mainly in the plane of drawing (x-z) since the "closest" electrode pair 1 and 2 is parallel to the y axis. In contrast, the main (not all) reorientation of LC molecules in the lower zone (between electrodes 3 and 4) will be mainly in the y-z plane that is perpendicular to the plane of drawing since the "closest" electrode pair 3 and 4 is parallel to the x axis.

However, of particular interest is the zone surrounding the area denoted by the letter θ that is between the above-mentioned zones (in the center of the cell). In fact, rotational orientation transition zones are expected around this area since the orientation of LC goes from the plane x-z to the plane y-z. The physics of twisted LC cells was intensively studied in the literature for LC displays (see, e.g., C. H. Gooch and H. A. Tarry, "The Optical Properties of Twisted Nematic Liquid Crystal Structures with Twist Angles≤90°, J. Phys. D; Appl. Phys., Vol. 8, 1975). It was already established that if the twisting period P and the effective anisotropy $\Delta n_{eff}$ are large enough then the input light polarization may be rotated with the twist of LC molecules as the light beam propagates through the LC material. This phenomenon defines a new fundamental mode of operation (cross-plane broadening thanks to the polarization rotation) of the element described hereafter.

In accordance with embodiments of the proposed solution, devices described herein are configured to operate with (drastically) different operation principles (physical mechanism) to provide simplifications in the construction of practical devices. Namely, with reference to FIG. 1 an incident light beam of arbitrary (including chaotic) polarization enters the LC cell from above (from the side of the top substrate 5, propagating in −z direction) traversing the device towards the bottom substrate 6). The incident beam polarization may be presented as a sum of two linear polarization components Ex and Ey (parallel to x and y axes, respectively). The electrode strips 1 and 2 are parallel to the y axis, while the electrode strips 3 and 4 are parallel to the x axis. If electrodes 1 and 2 are activated with different electric potentials, then the activation will create (in "upper" layers) a molecular reorientation mainly in the plane x-z (schematically shown in the upper part of the FIG. 1, denoted by $\Delta z$). The input linear polarization component Ex (in this case, the extraordinary polarization) will then be broadened in the x-z plane due to the "upper" layers (slices) of the non-uniformly reoriented LC molecules. However, in addition, this polarization component will be rotated (as well as partially changing its polarization state) along its further propagation towards the bottom substrate 6 if the electrodes 3 and 4 are also simultaneously activated with further different potentials. In fact, in this configuration, the lower part of the LC cell by-and-large has more or less similar reorientation of LC molecules in the upper part of the cell (as in the zone Δz) but in the perpendicular plane. However, the two zones (upper and lower areas of LC molecular orientations) being more or less in perpendicular planes) the central zone (at the level of the letter θ in FIG. 1) represents a transition zone with molecular twist. If the parameters of the LC cell, its reorientation and the wavelength range of light are appropriately chosen, then the linear polarization component Ex will arrive at substrate 6 with rotated and transformed polarization mainly being parallel to the y axis.

Due to this polarization rotation and transformation, the same polarization component Ex will reach the area affected by electrodes 3 and 4 as mainly a polarization that is perpendicular to the electrode lines 3 and 4. Thus, it will be also broadened in the plane y-z.

At the same time, the input polarization component Ey will mainly remain "unaffected". It will enter into the LC cell as mainly "ordinary" type of polarization and will also undergo polarization rotation (with some partial change of the degree of polarization also) to reach electrode strips 3 and 4 still as "ordinary" polarization. Thus, the LC cell will not affect noticeably the input polarization that was originally parallel to the y axis.

Thus, the simultaneous activation and phase shift between electrodes enable employing a single LC cell to broaden a given linear polarization component of light in two (azimuthal) planes. This type of the LC cell enables the construction of a full-polarization operational device (broadening unpolarised light in two azimuthal planes) by just adding another similar (as described herein with reference to FIG. 1) LC cell (element) to the first LC cell. In addition, this may be achieved without using any polarization rotation element (since the LC itself is used to dynamically rotate the light polarization). Indeed, the addition of a second similar LC cell (the "entrance/input side" electrode pairs of the second LC cell being crossed with respect to the "exit/output side" electrode pairs of the first LC cell) and the progression of main polarization and broadening states are schematically presented in the FIG. 2A which describes schematically an idealized geometry where both pairs of electrodes (1 and 2 on top substrate 5 and 3 and 4 on bottom substrate 6) are activated with relative phase shift of 180 degrees. Thus, the E1 and E2 are input polarizations (parallel to y and x axis, respectively). The input pair of electrodes 1 and 2 (at the entrance substrate) is parallel with x axis. Thus, according to the mechanism, described above, the E1 component will be broadened in the y-z plane by the entrance slices of the first LC cell. The E2 component will not be affected. Both components will propagate along the z axis towards the exit slices of the first LC cell. There will be a 90 degree rotation of those two polarization components during that propagation. Thus, the "original E1 component will reach the exit slice of the first cell being perpendicular to the pair of electrodes 3 and 4 (on the exit substrate). It will be broadened in the x-z plane when exiting the first cell. The original E2 component will reach the reach the exit slice of the first cell being parallel to the pair of electrodes 3 and 4 (on the exit substrate). It will not be noticeably affected after the exit from the first cell. A similar process will happen during the propagation in the second LC cell, but, this time, the "original" E2 component will be broadened in two (x-z and y-z) planes.

Figure 2A:
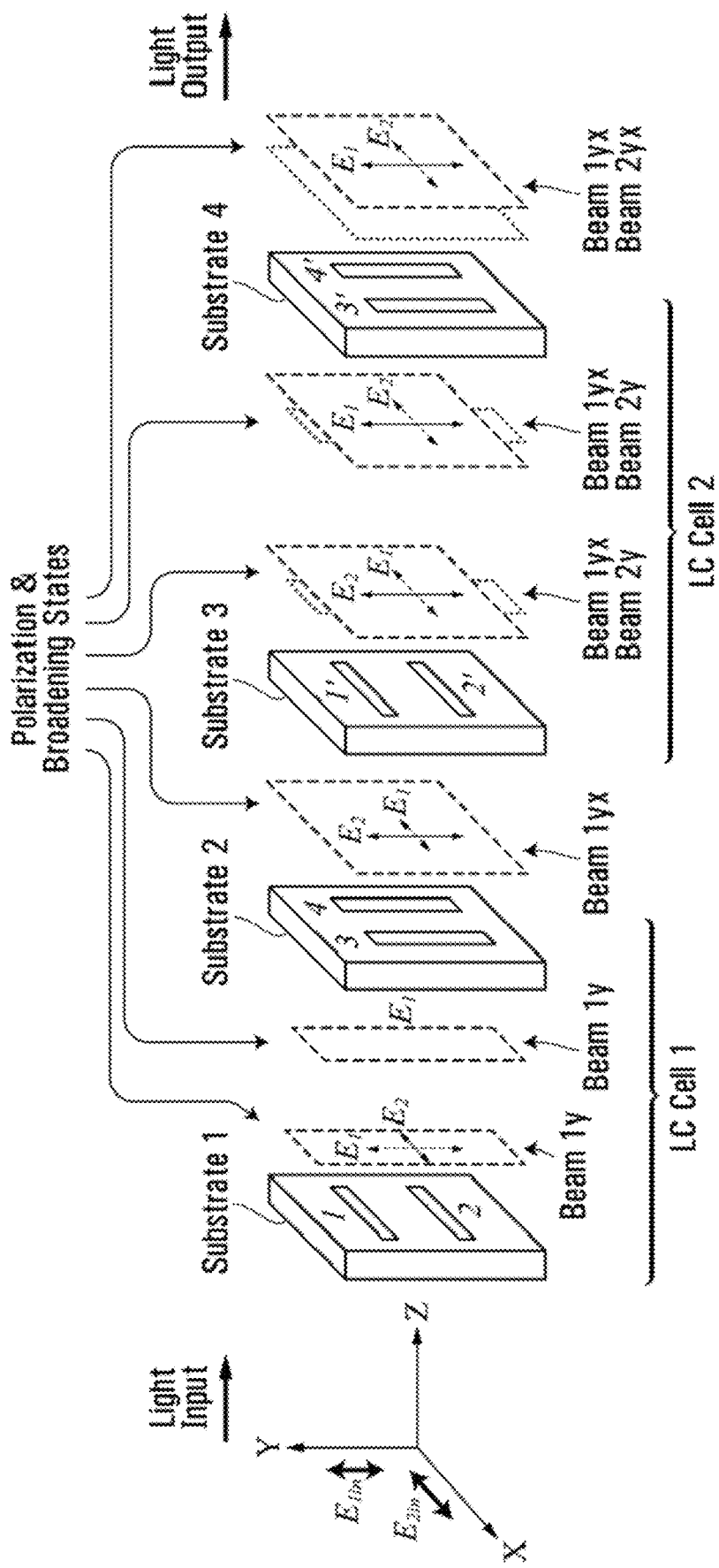
FIG. 2A is a schematic illustration of the evolution of broadening and polarization transformation of a light beam propagating in a device with two LC sandwiches (for broadening unpolarised light in two azimuthal planes) based on the discovered operation mode herein, in accordance with an embodiment of the proposed solution.
Figure 2B:
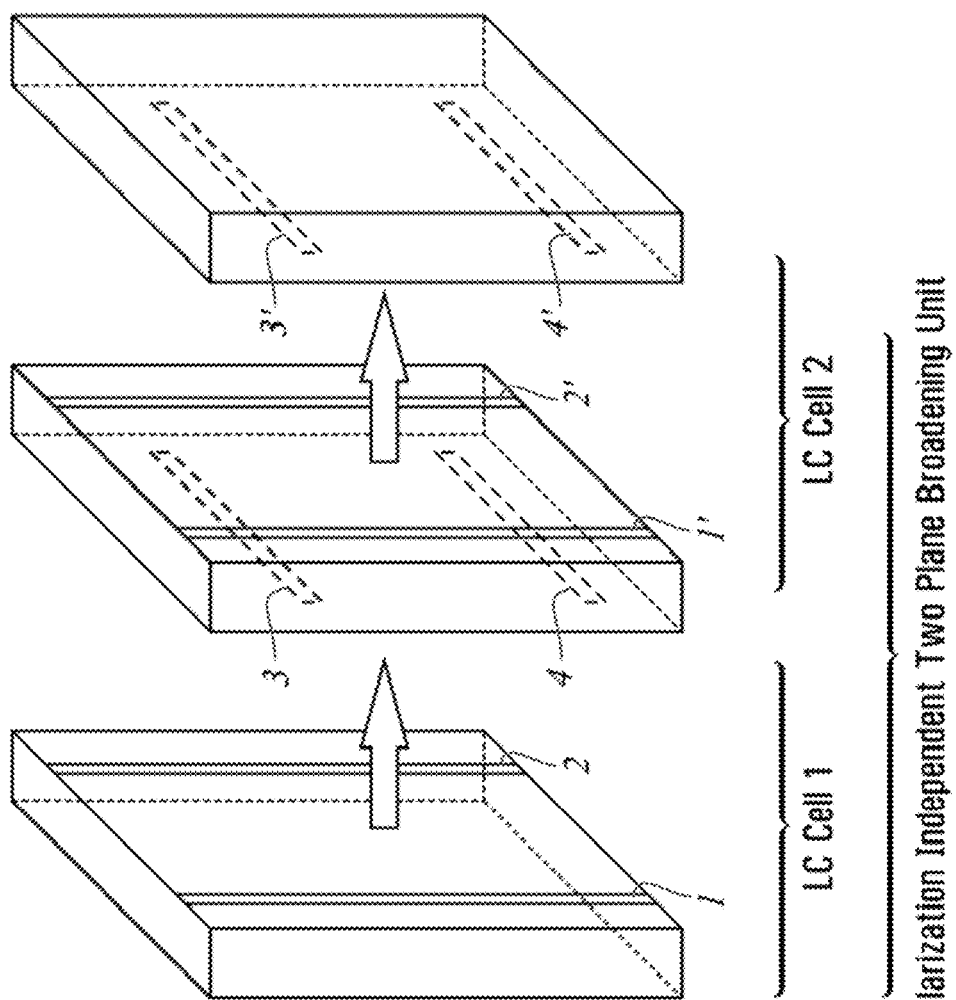
FIG. 2B is a schematic illustration of a cost effective final device (for broadening unpolarised light in two azimuthal planes) based on the discovered operation mode herein, in accordance with an embodiment of the proposed solution.
Figure 2C:
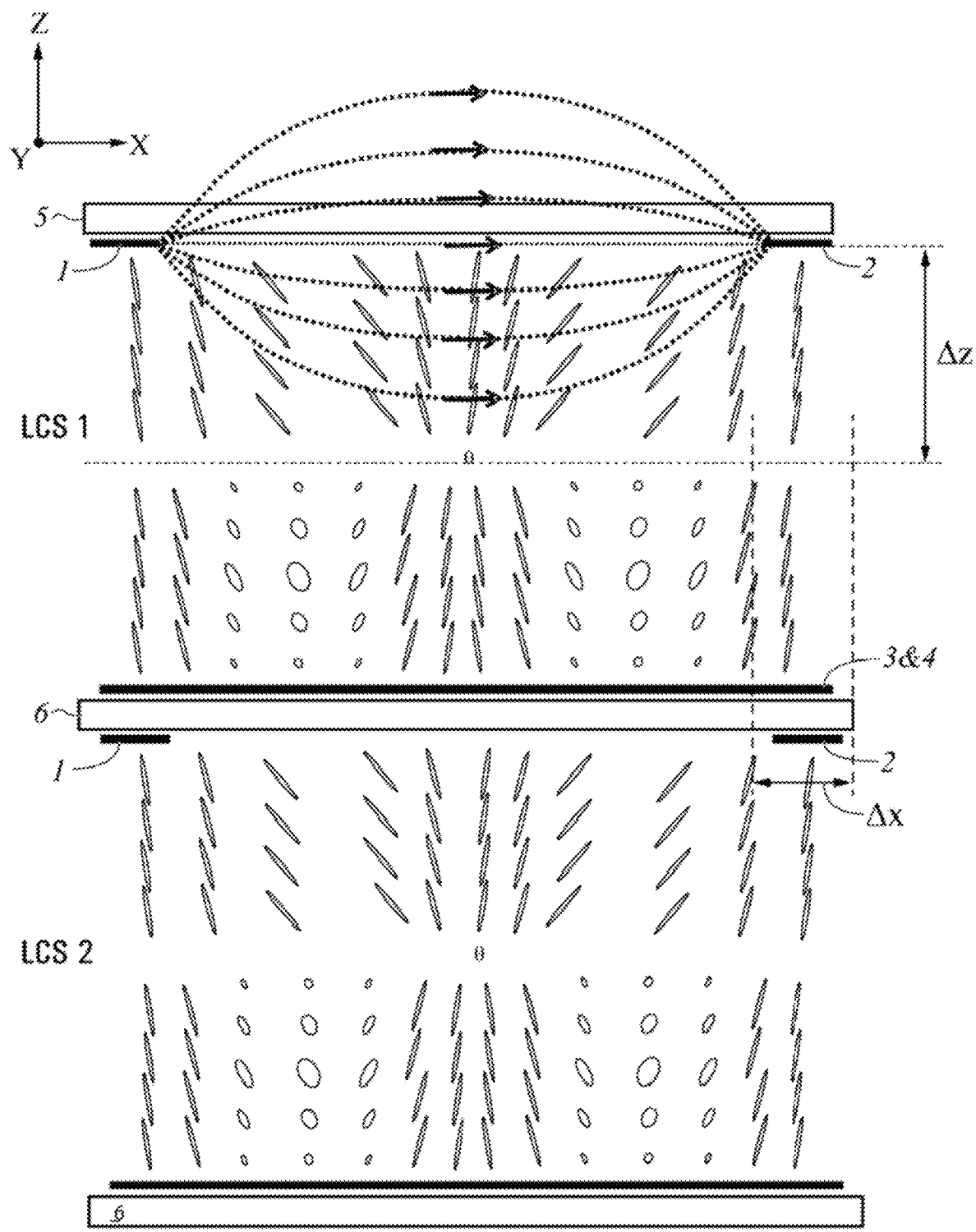
FIG. 2C is a schematic cross-sectional view of two LC sandwiches in which each sandwich has a homeotropic ground state LC alignment with the internal electrodes of the opposed cell substrates that are orthogonally arranged.

FIG. 2B shows schematically the combination of two cells using only three substrates (one common) that can reduce the thickness and the cost of the combined device, and FIG. 2C shows schematically the cross section of the corresponding (to FIG. 2B) combination of two such cells in a manner similar to FIG. 1.

The fact that there is no need for a polarization rotation element and no need for rubbing of the alignment layers (simple homeotropic or vertical alignment may be used here) simplifies greatly the manufacturing of such a beam control device which enables employing only three substrates and only four electrode layers, as shown in the example in FIG. 2B illustrating a low-cost polarization insensitive element for light beam broadening in two azimuthal planes thanks to the electric field induced internal polarization rotation.

Figure 3A:
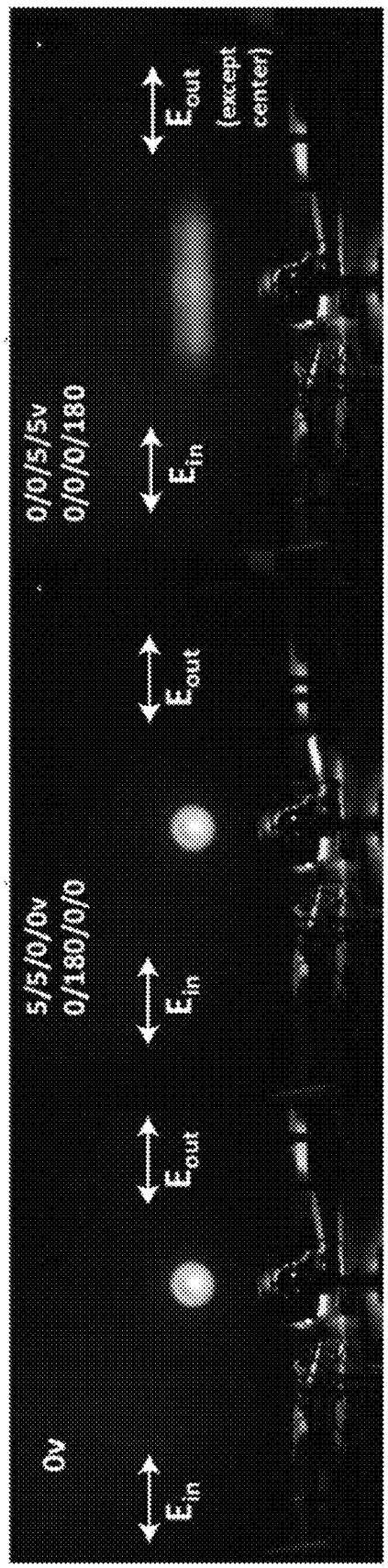
FIG. 3A illustrates an experimental demonstration of beam broadening and polarization transformation of that beam when only one (horizontal) of the polarization components of input light is present and only one (first horizontal then vertical) electrode layers is activated in accordance with an embodiment of the proposed solution.
Figure 3B:
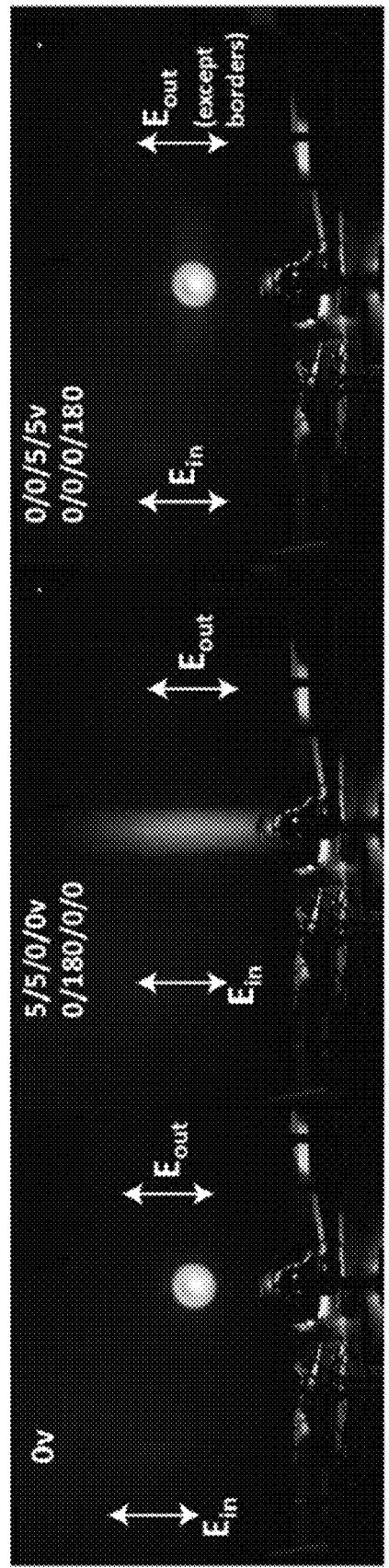
FIG. 3B illustrates an experimental demonstration of beam broadening and polarization transformation of that beam when only one (vertical) of the polarization components of input light is present and only one (first horizontal then vertical) electrode layers is activated in accordance with an embodiment of the proposed solution.
Figure 3C:
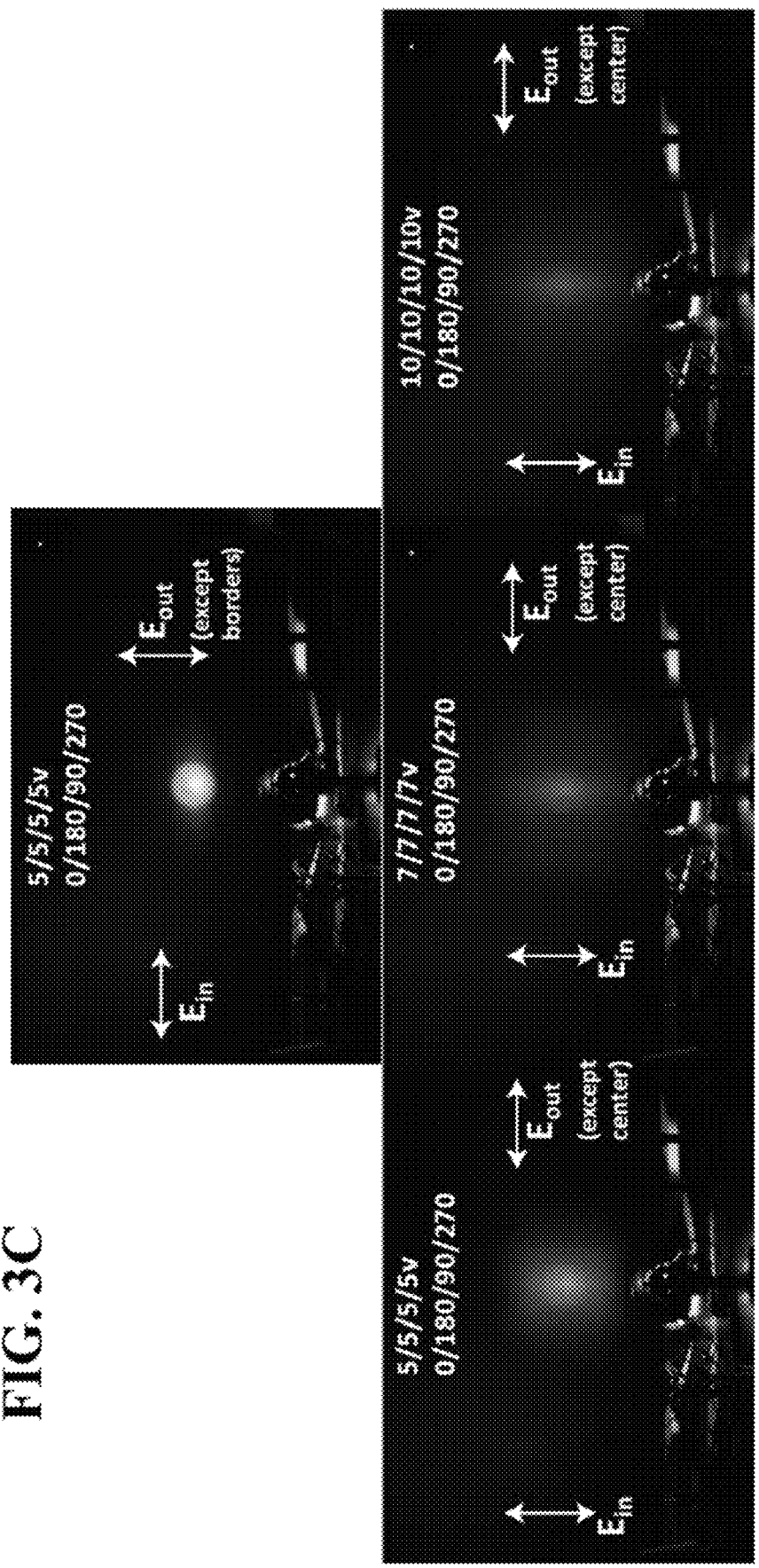
FIG. 3C illustrates an experimental demonstration of beam broadening and polarization transformation of that beam when both of the electrode layers are activated, in accordance with an embodiment of the proposed solution.

The corresponding experimental confirmation is demonstrated with success in FIGS. 3A, FIG. 3B and FIG. 3C. Indeed, in the example illustrated here, the pair of electrodes on the entrance substrate is "horizontal", while the pair of electrodes at the exit substrate are "vertical". FIG. 3A shows the case of incident light with linear polarization that is "horizontal" (parallel to entrance pair of electrodes). FIG. 3B shows the case of incident light with linear polarization that is "vertical" (parallel to exit pair of electrodes). The left figures show the beam when the cell is in the ground state (no activation). The middle photos show the case when only the first pair of electrodes is activated (with different electric potentials). The right-side pictures show the case when only the exit pair of electrodes is activated (with different electric potentials).

Applicant's experiments confirm that there is no polarization rotation when only one pair of electrodes is activated within the single LC cell (either 1 and 2 in FIG. 3A or 3 and 4 in FIG. 3B). There is no broadening of light in the ground state of the LC cell (left pictures in FIG. 3A and FIG. 3B) as well as in the case when one pair of electrodes is activated, but the input light polarization is parallel to those activated electrodes (middle picture in FIG. 3A and right picture in FIG. 3B). In contrast, there is broadening of light only in one plane (and still without polarization rotation) when the activated pair of electrodes and the input light polarization are perpendicular (right picture in FIG. 3A and central picture in the FIG. 3B). Thus, the light broadening is obtained only in the plane that is perpendicular to activated electrode pair.

FIG. 3C illustrates our experimental results when both pairs of electrodes (1 and 2 as well as 3 and 4) are activated with different potentials and phases. When both finger-like electrode pairs on corresponding substrates are simultaneously driven: 90° rotation of light polarization is observed, all-direction (two azimuthal plane) broadening for one polarized component (with the second polarization component remaining largely unchanged), and providing good rectangular pattern of a broadened light beam (projection). Thus, the top central picture demonstrates the case when the incident light has "horizontal" polarization (the LC cell is the same as before, with entrance electrode pairs being "horizontal"). In this case, essentially a 90 degrees rotation (accompanied with slight changes of the degree of polarization) is observed without a noticeable broadening on that light. The vertical double arrow illustrates the orientation of the analyzer, allowing the passage of only "vertical polarization component of light.

The bottom left picture of FIG. 3C illustrates the fact that the input light with "vertical" polarization is broadened and there is also essentially a 90 degrees rotation of its polarization at the exit of the LC cell. This broadening is more pronounced for higher voltages (middle and right pictures of FIG. 3C).

Figure 4B:
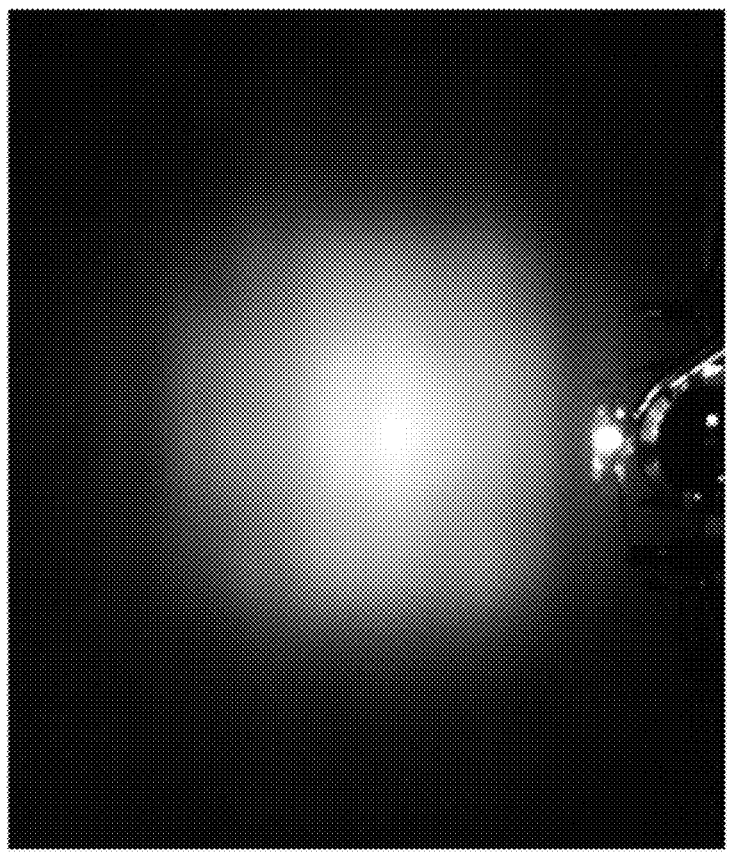
FIGS. 4A and 4B illustrate via experimental demonstrations the importance of having independent electrodes and applying the selected phase delays to obtain acceptable light broadening.
Figure 4A:
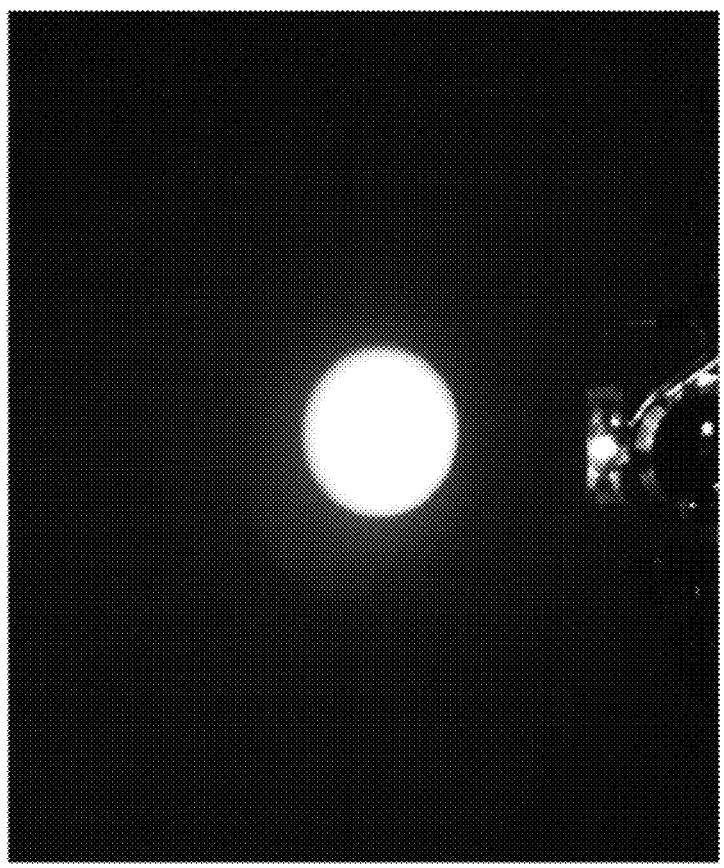
Figure 5:
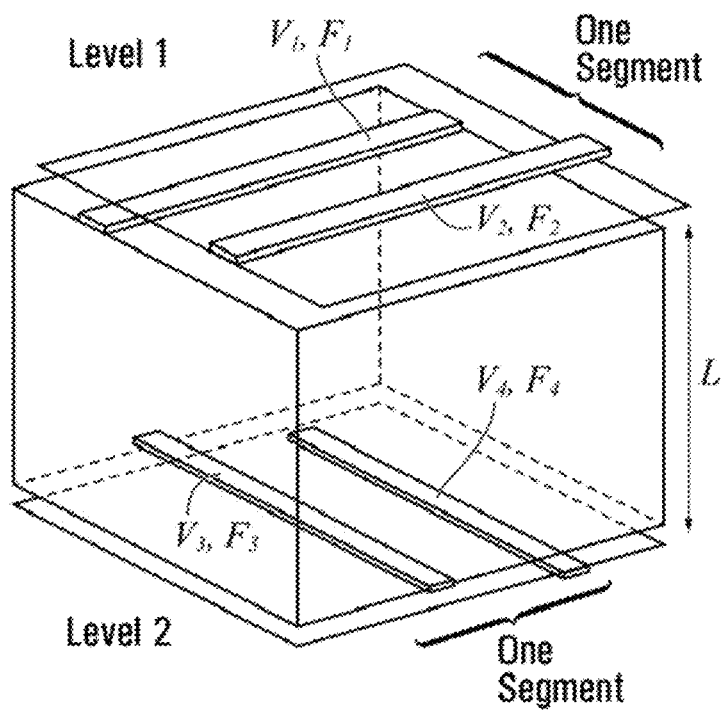
FIGS. 5 and 6 are schematic illustrations of double layered electrode configuration wherein "pairs" of independently controlled electrodes are fabricated at different levels (separated by thin isolation layers)
Figure 6:
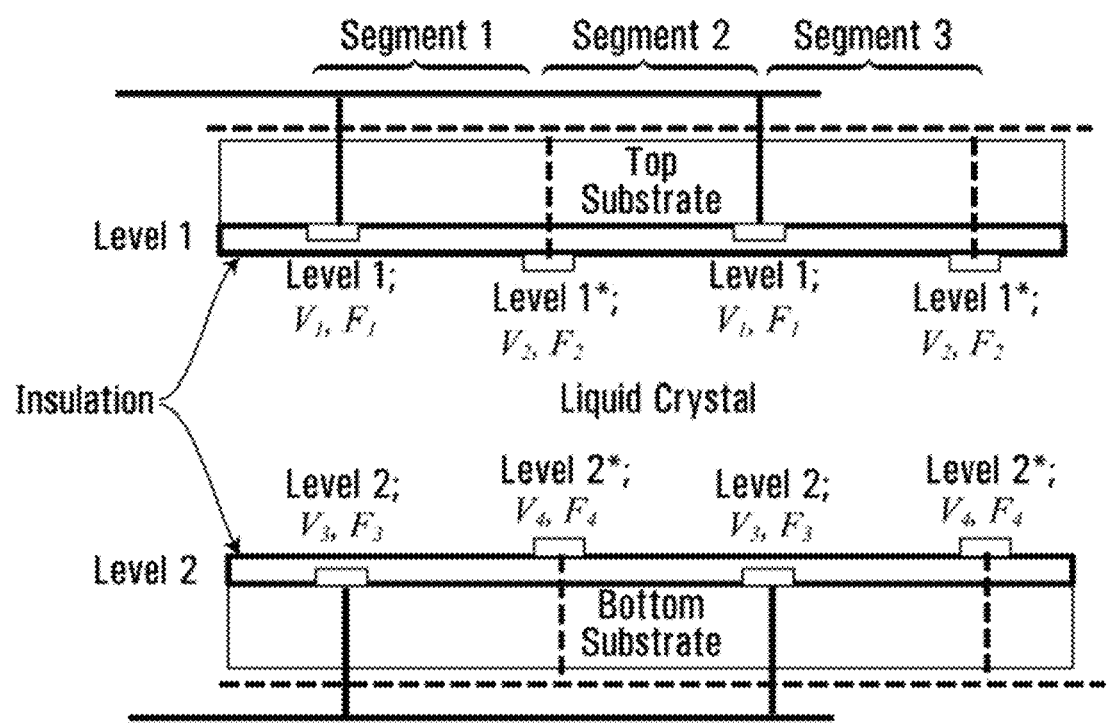

FIGS. 4A and 4B illustrate experimental demonstration of the importance of having independent electrodes and applying thereto corresponding drive signal components having (appropriate) selected phase delays therebetween to obtain useful acceptable light beam broadening. In FIG. 4A all electrodes are driven at 5V in phase, while in FIG. 4B all electrodes are driven with 5V drive signals however the signal phases are provided with 0, 180, 90 and 270 degree delays. Alternative driving approaches may also be used such as 0, 180, 90, 270 or 0, 180, 0, 180 degrees In another embodiment of the proposed solution, similar performance may be achieved by using two layers of electrodes (separated by a thin insulating layer) to build independently controllable electrode pairs for example as schematically illustrated in FIG. 5 and FIG. 6. Insulation of the electrodes prevents shorts (during the manufacturing), reduces the current flowing between electrodes (reducing thus the power consumption) and allows various electrode configurations on the same substrate to increase the functionality of the cell.

In another embodiment of the proposed solution, two LC cells will be spatially shifted with respect to each other and preferably in the diagonal direction (with respect to electrode lines). Such a configuration avoids the coincidence of zones where the reorientation of molecules is not appropriate (such as disclination regions). For example, employing homeotropic alignment (FIG. 1), LC molecules tend to remain homeotropic just under (adjacent to) the electrodes. If such disclination regions register (are the same for both) between LC cells, then the light passing through such disclination zones will not follow the same mechanism of modulation.

In another embodiment of the proposed solution, a small (separation) distance may be considered between the two unit LC cells which can improve the light intensity distribution.

Figure 7A:
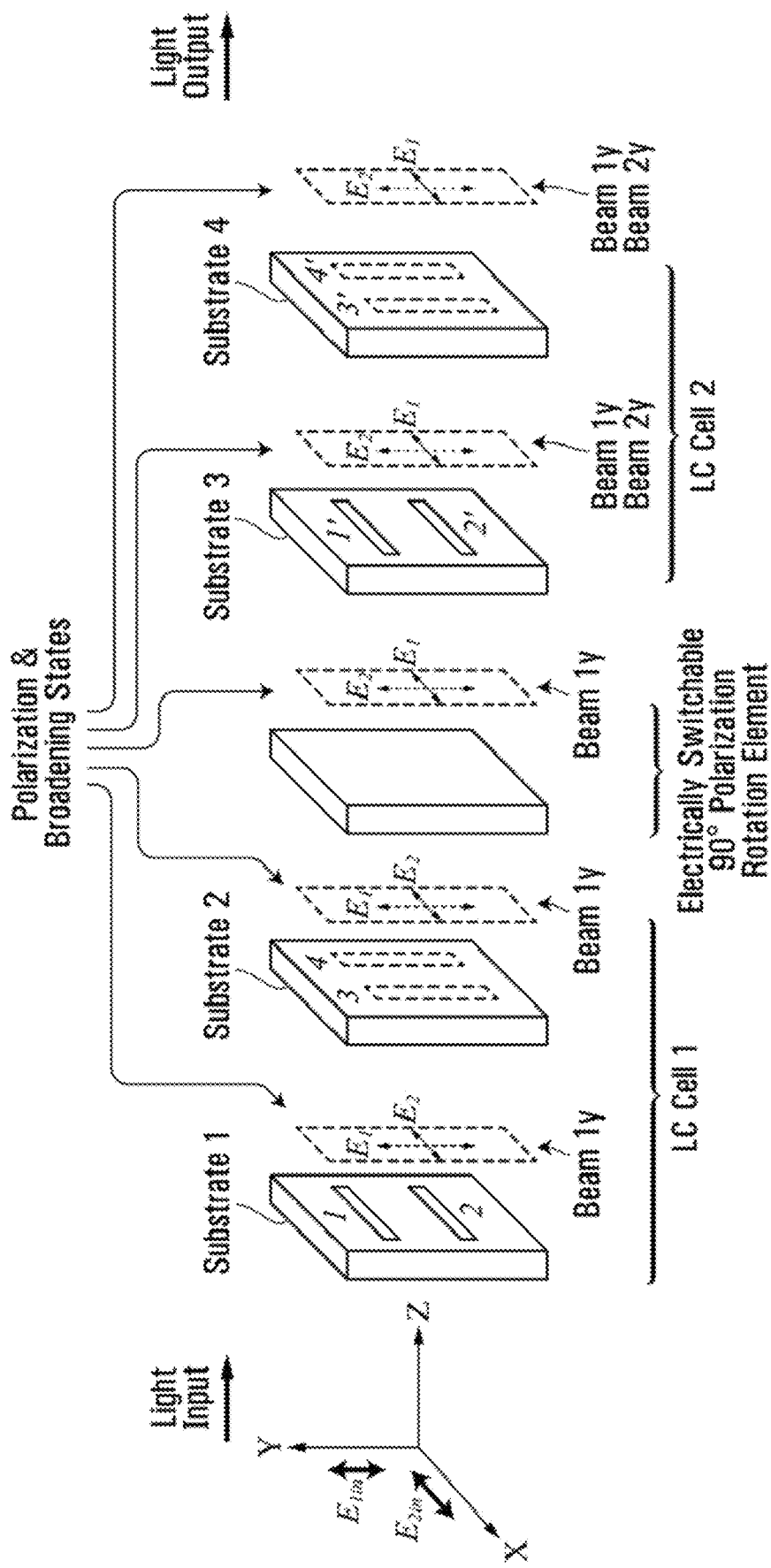
FIGS. 7A, 7B and 7C are schematic illustrations of a universal beam control device capable of broadening an unpolarized input light beam in one desired (azimuthal) plane only, e.g., azimuthal YZ, FIG. 7A or in the plane perpendicular to the azimuthal plane, and double broadening of the desired polarization component of light letting the perpendicular component remain unaffected (FIG. 7B) and the polarization rotation (between cells) are activated in accordance with an embodiment of the proposed solution (the polarization rotation must be removed to go back to the symmetric broadening mode), or symmetrically broadening unpolarized light in two perpendicular planes (FIG. 7C)
Figure 7B:
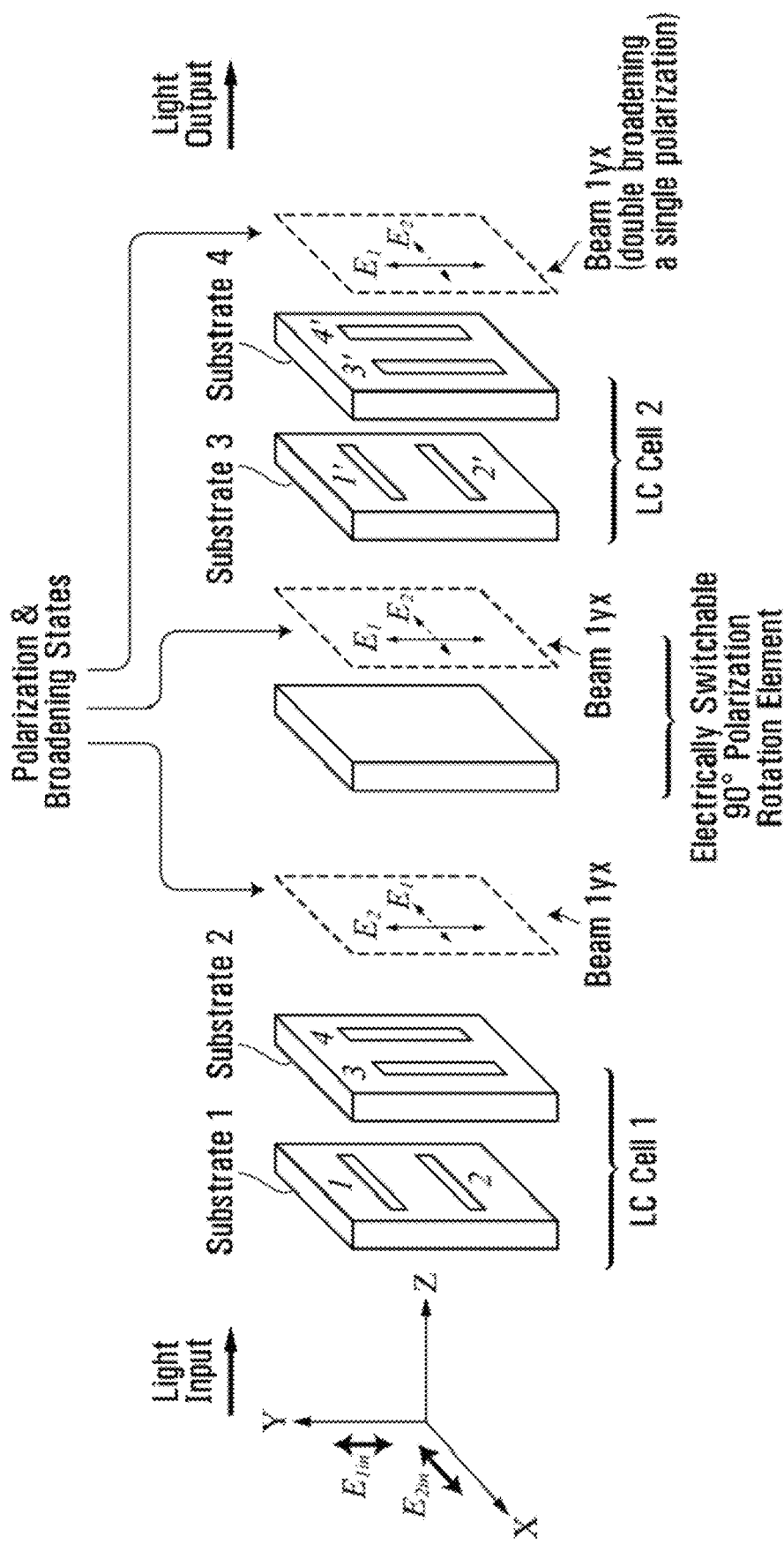
Figure 7C:
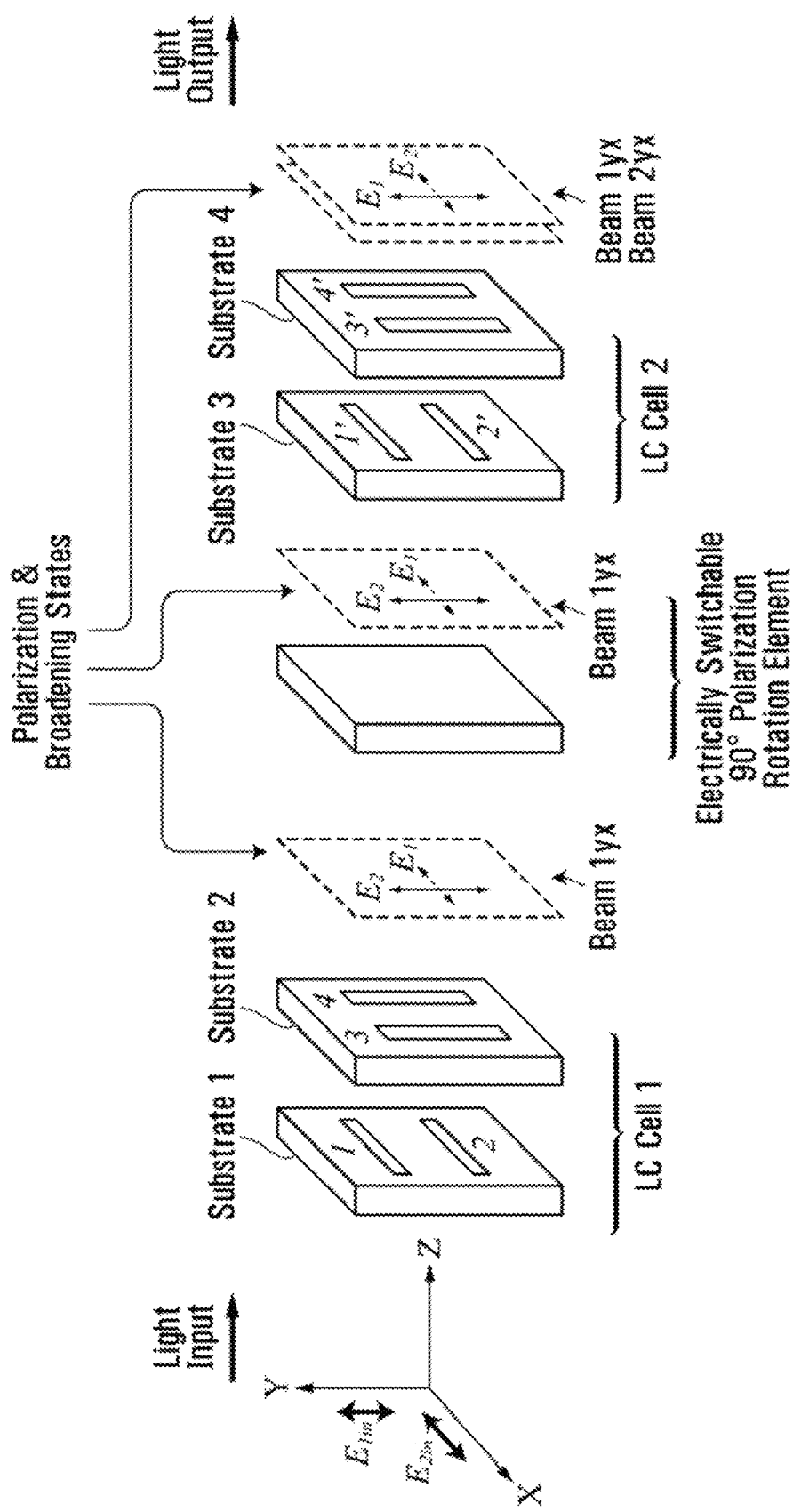

In another embodiment of the proposed solution, an electrically variable (switchable) polarization rotation element can be employed (such as a standard twisted LC cell) between two unit LC cells to enhance the device operational capabilities. FIG. 7 schematically demonstrates such a beam control device which is capable of broadening unpolarised light in one desired (azimuthal) plane only (or in the perpendicular azimuthal plane) and/or double broadening of the desired polarization component of light while the other (perpendicular) component remains substantially unaffected. Thus, if the electrically switchable 90 degree polarization rotation element (in the middle of FIG. 7A) is in its "rotation mode", then the first LC cell may broaden the "vertical" input polarization component of light ($E_{1in}$), for example, in the plane y-z if only the first pair of electrodes (1 and 2) is activated as shown. As it was demonstrated above, there will be no polarization rotation inside of the LC cell for this polarization component. Also, there will be no broadening nor polarization rotation for the "horizontal" polarization component of input light ($E_{2in}$). Then, both components will be rotated to 90 degrees with the help of the electrically switchable polarization rotation component and will reach the second cell; now the $E_{1in}$ being in the "horizontal" plane and the $E_{2in}$ being "vertical". If, in the second cell also, we activate only the first pair of "horizontal" electrodes (1' and 2') then now only the $E_{2in}$ component will be broaden in the y-z plane while the $E_{1in}$ component will pass through without noticeable modification. Thus, we shall obtain broadening of both polarization components ($E_{1in}$ and $E_{2in}$) in one desired y-z plane. Alternatively, we can activate the electrodes 3 and 4 as well as 3' and 4' only (but not electrodes 1, 2 and 1' and 2') and obtain a similar broadening but in the x-z plane. This will allow stretching light in two perpendicular planes when desired.

Alternatively, if we activate all electrodes (with different potentials) as well as the polarization rotation element (performing 90 degrees rotation) then this device will allow very strong (double) broadening of a single polarization component in both perpendicular planes (FIG. 7B), while leaving the perpendicular polarization unchanged.

In contrast, if the electrically switchable 90 degree polarization rotation element (in the middle of FIGS. 7A to 7C) is in its "passive mode" (no rotation of polarization; for example when applying very strong electric field and all of its molecules become homeotropically aligned), then the operation of the entire assembly can be returned to the symmetric mode (FIG. 7C): simultaneous broadening of both polarization components in two perpendicular planes.

The arrangement of the electrodes described above has been only schematic and done for illustration of the LC direction of orientation. It will be appreciated that the electrode spacing can be quite small, as can the width of each electrode, while the layer of LC is likewise small, and the device can remain effective for beam broadening. For example, the gap between the electrodes can be in the range of 30 to 120 microns with a LC layer thickness of about 60 to 150 microns. While linear strip electrodes 1, 2, 3, 4 can be used to provide beam control elements that are straight; zigzag patterns, sinusoidal patterns, spirals, concentric, radial and other geometric patterns can be used.

Figure 8A:
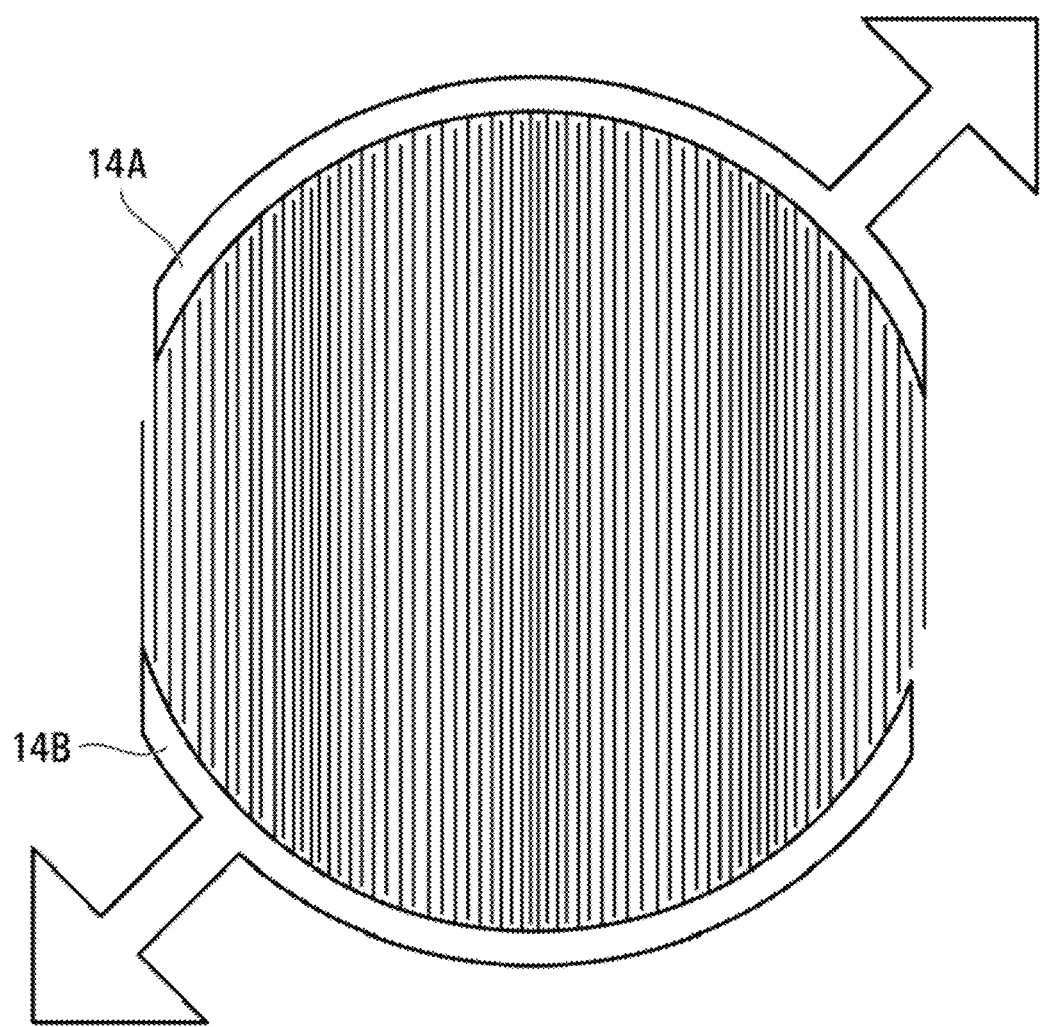
FIG. 8A is a schematic plan view diagram illustrating an array of chirped strip electrodes having a spatially variable gap or spacing between the strip electrodes in accordance with the proposed solution.

Regular spacing or a "chirping" variation in the spacing between electrodes can be used. In FIG. 8A, there is shown a circular aperture in which the parallel electrodes on each substrate extend in a uniform direction. The electrode gap is 50 microns in the middle of the 6 mm device aperture and 100 microns at the outer sides. In the example illustrated, the gap g increases (can also decreases) by 5 microns from one gap to the next. Small gaps may provide a higher beam shaping or beam steering ability or power, and larger gaps would rather provide smaller power. Such variation of electrode gap g may be linear or non-linear. An effect of the variation, or chirp, can be to eliminate or reduce color separation and formation hot spots or lines (high intensity zones) in the (transmitted) projected light beam. This is because different portions of the overall optical device will redirect the same wavelength (i.e. color) of light in different directions.

Figure 8B:
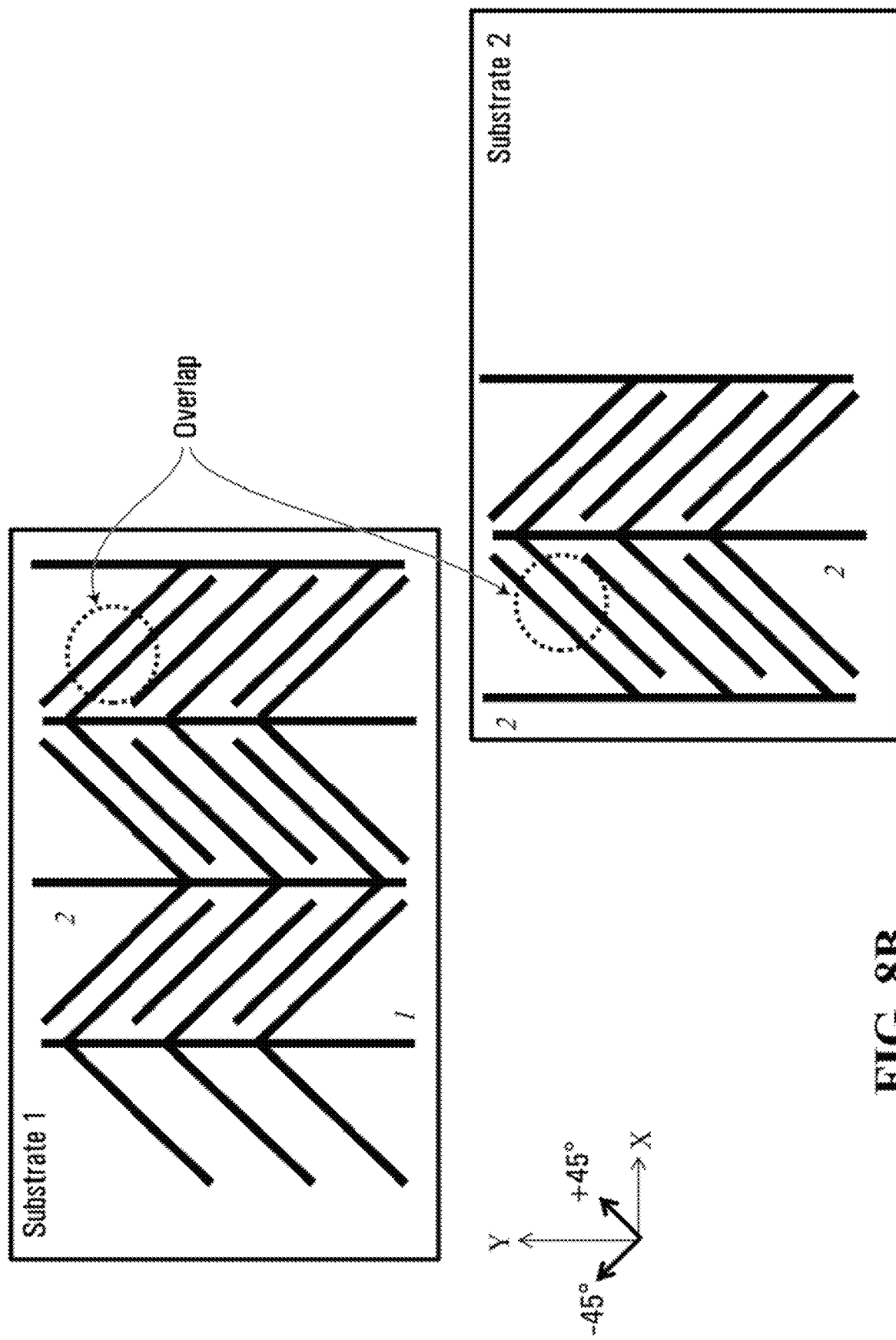
FIG. 8B is a schematic plan view of substrates of a LC cell with "excited" twisted molecular reorientation (when all electrodes on opposed substrates are activated simultaneously and independently with different phases) which may be used to broaden unpolarized (natural) light in two (azimuthal) planes in accordance with an embodiment of the proposed solution.

As it can be appreciated from FIG. 8B, the electrode pairs may be etched (or printed) in a "tree-like" manner to have interdigitated electrodes 1 and 2, which are still locally parallel while their orientation alternates on 90 degrees from zone to zone. This herringbone pattern shown creates different regions of parallel electrode orientation directions that are orthogonal to each other. It is possible to have any number of regions of different orientation direction, and the regions can be interleaved as in FIG. 8B or distinct as in FIG. 9.

The same pattern may be etched or printed on the opposed surface (on the second glass substrate), however during the cell assembly glass substrate 2 would be shifted with respect to the first glass substrate, such that the two encircled zones face each other with electrodes on the glass substrate 2 being perpendicular to electrodes of glass substrate 1 in the zone.

Applicant has discovered that the beam broadening is not symmetrical in x-z and y-z planes (directions) in the geometry of electrodes shown in FIG. 2A. This is related to the asymmetry of the geometry, namely, the broadening in y-z plane, defined by the substrate 1 (for E1 polarization) and the substrate 3 (for E2 polarization), which affects mainly the incident half of the propagation path of the light within the device, and the broadening in the x-z plane (direction), defined mainly by the substrate 2 (for E1 polarization) and the substrate 4 (for E2 polarization), which affects mainly the outgoing half of the propagation path of light within the device, do not have the same efficiency. This asymmetry can be corrected using special interdigitated electrode patterns where all (1, 2, 3 and 4) substrates participate in both x-z and y-z broadening directions equally. This can be achieved for example by designing of paired sets of interdigitated electrodes on the same substrate, each set of electrodes being orthogonal to the other one. Such a design is shown in, without limiting the invention thereto, in FIGS. 8 and 9 as described hereinbelow.

In addition, some intensity non uniformities may be observed in the transmitted light, such as high intensity spots or lines, defined by the orientation of the above mentioned electrodes.

Figure 9:
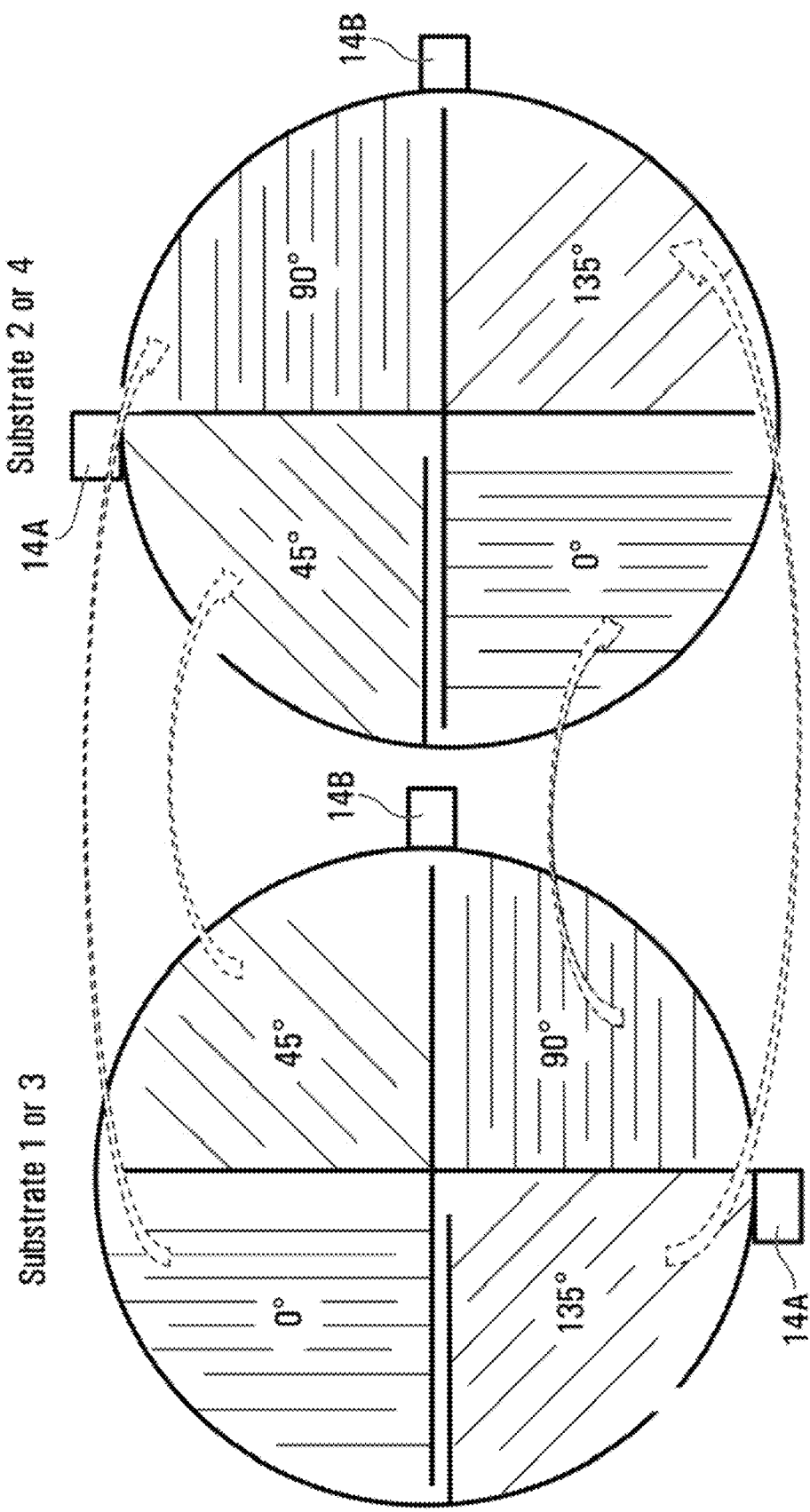
FIG. 9 is another schematic plan view of the substrates of another LC cell with multiple (here 4) segments that are "excited" to generate twisted molecular reorientation (when all electrodes on opposed substrates are activated simultaneously and independently with different phases) which may be used to broaden unpolarized (natural) light in two (azimuthal) planes in accordance with an embodiment of the proposed solution.

Applicant has discovered that we can reduce the above mentioned asymmetry and non-uniformities by using segmented electrode zones. FIG. 9 illustrates another geometry with, for example, four sets of interdigitated electrodes on each substrate in four different regions or quadrants, in which we have two pairs of electrode pairs (oriented in a total of four directions), two pairs of electrodes are made from "horizontal" and "vertical" electrodes, while two other electrodes are tilted by 45 degrees in respect to the others. It will be appreciated that a beneficial effect provided by having different regions can be achieved beginning with only two regions. The orientation of substrates is made in a way that for each position of light incidence and propagation, two cross oriented pairs of electrodes are present. However, the orientations of those electrodes are different depending upon the incidence point of light. The LC cell may be filled, for example, by a homeotropically aligned liquid crystal (without rubbing). In this configuration, locally, the encircled zone (and others by analogy) acts like in the configuration where linear interdigitated electrode pairs were pointing in a given direction on the first substrate and the same pattern, but turned at 90 degrees is employed on the second substrate. Such a single LC cell provides beam broadening of light with an input polarization that is perpendicular to the electrodes (at the first "entrance" glass substrate) in the plane perpendicular to those electrodes and the same light will be broadened in the perpendicular plane near to the exit surface (after having its polarization rotated by 90 degrees). The same concept can be used with different types of electrode arrangements. This additionally will improve the broadened light uniformity by better distributing the light intensity and by smoothening the cross like patterns observed for incident low divergence light beams.

Figure 10:
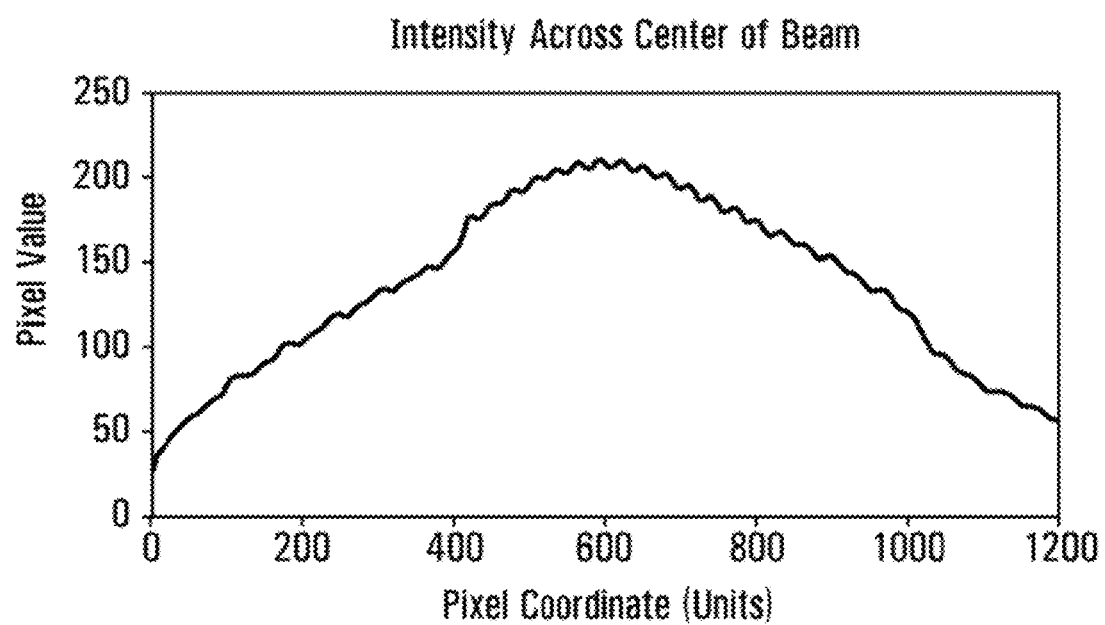
FIG. 10 is a plot of the beam intensity for a beam passing through a device according to FIG. 2 taken along a line passing through the transversal cross-section of the beam that shows a rippling (periodic spatial modulation) effect in the beam intensity.
Figure 11:
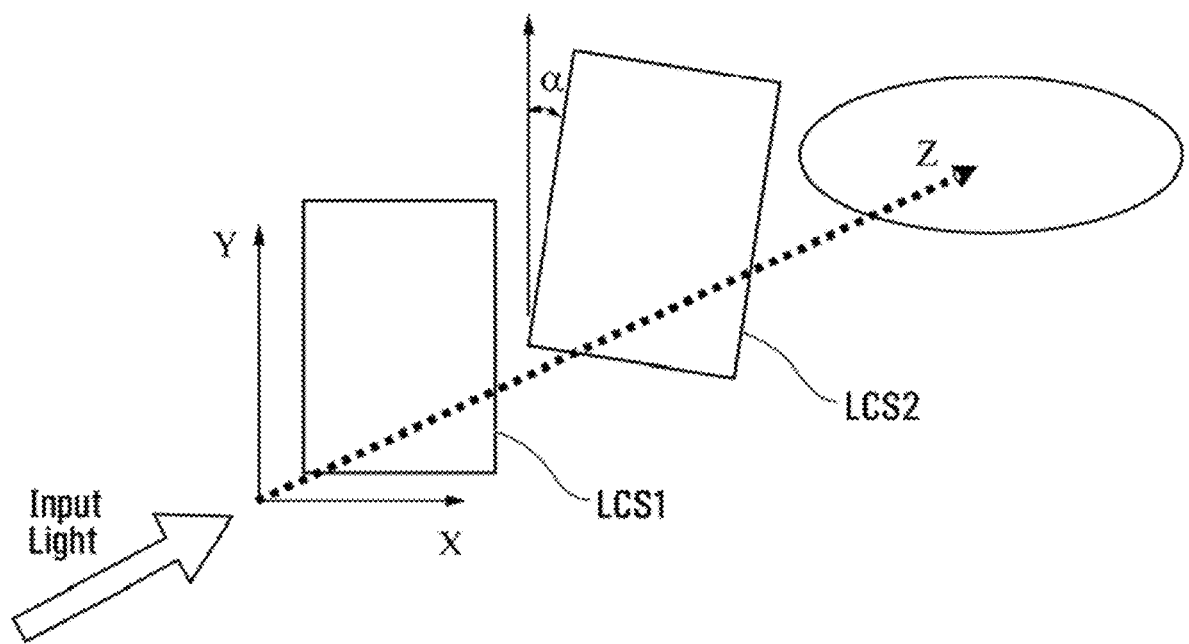
FIG. 11 is a schematic illustration of two LC sandwiches according to FIG. 2 in which a small angle rotation is provided between the LC sandwiches.
Figure 12:
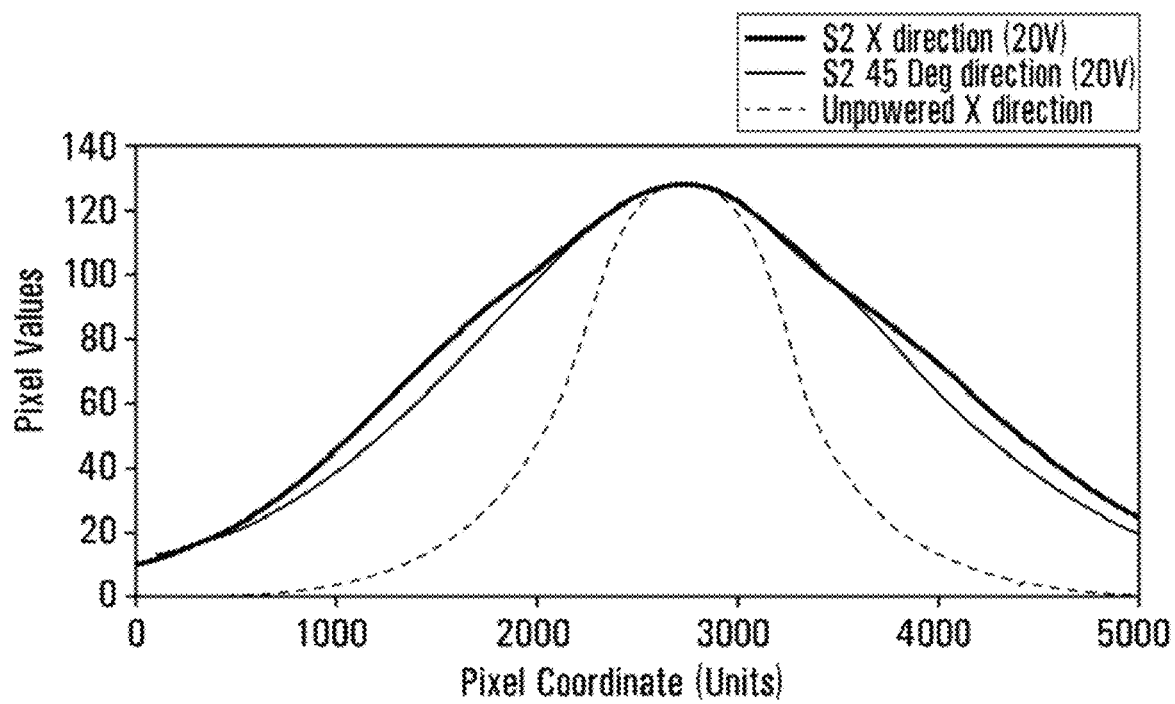
FIG. 12 shows plots of the beam intensity in ground state (unpowered) and excited states taken along horizontal and at 45 Degree lines passing through the transversal cross-section of the beam that shows how the rippling effect in the beam intensity is mitigated by the small angle rotation using the configuration of FIG. 11.
Figure 13:
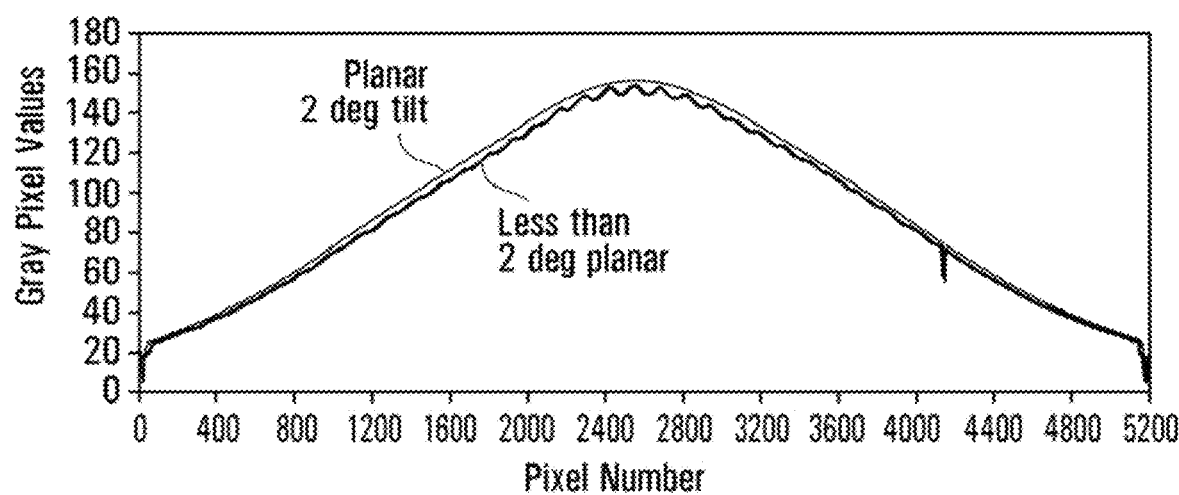
FIG. 13 is a plot of the beam intensity for a beam passing through a device according to FIG. 2 taken along a line passing through the transversal cross-section of the beam that shows a rippling effect in the beam intensity and a plot of the beam intensity for a beam passing through a modified device according to FIG. 11 in which there is a rotation of 2 degrees between LC cells 1 and LC cells 2 taken along a line passing through the transversal cross-section of the beam that shows absence of the rippling effect in the beam intensity.

As shown in FIG. 10, the beam intensity from the arrangement of FIG. 2A produces a small intensity variation (periodic spatial modulation or "ripple" of intensity). The applicant has discovered that by introducing a rotational offset between the two LC sandwiches of FIG. 2A of approximately 5 degrees, as shown in FIG. 11, it has been observed that the ripple in the intensity is greatly mitigated, as shown in FIGS. 12 and 13. As can be seen, the improvement in the beam intensity profile is significantly improved. This improvement is found to occur beginning at about 2 degrees of rotation (see FIG. 13 for the comparison between no rotation and 2 degrees of rotation), and the rotational offset is best limited to within about 8 degrees. Rotations larger than about 8 degrees can adversely affect the ability to handle both polarizations for beam broadening in both directions equally.

The rotational offset can involve a physical rotation of the same electrode pattern on each of the two sandwiches, or it can be a selection of patterns that will provide the rotational offset of the large number of small beam broadening strips disposed between parallel electrodes are active in modulating the beam over the aperture between the two sandwiches or cells 1+2 and 3+4.

The device can be made as illustrated in FIG. 2B with a common substrate between the two LC sandwiches, or it can be made with separate substrates such that each sandwich can be made separately. Providing the rotational offset when the two sandwiches share the same middle substrate can involve printing the electrodes of each sandwich to have the desired rotational offset.

One example of the latter is to arrange the finger electrodes of a rectangular substrate to be at, for example, 88 degrees from the edge of the substrate with the finger electrodes of the adjacent sandwich having, for example, 92 degrees from the edge of the substrate, such that there would be a 4 degree rotational offset between the two sandwiches. When the desired device has a circular aperture, the whole electrode arrangement can be rotated in one or both sandwiches or cell groups, and the combined sandwiches will have the desired rotational offset.

This can be useful when multiple beam broadening devices are made from a larger substrate as a wafer and then singulated into individual single or double sandwiches.

When two identical single sandwich singulated LC devices having rectangular shapes and electrode fingers orthogonal to the sides are used together, the small rotational offset can be provided during a step of bonding the LC sandwich devices together or by the mounting frame that holds the devices together. The singulated devices will thus not be square together. When the electrode patterns are rotated with respect to the sides of the singulated sandwich devices, then they can be bonded together or mounted together to be square.

The term "printing" is used, since silkscreen printing is a common way of placing an electrode on the substrate. It will be understood that the proposed solution is not limited to silkscreen printing or other printing techniques, as a variety of deposition techniques can be used. Thin wire electrodes can be bonded, incorporated or otherwise attached. Electrodes can be opaque conductors or transparent as desired.

Figure 14:
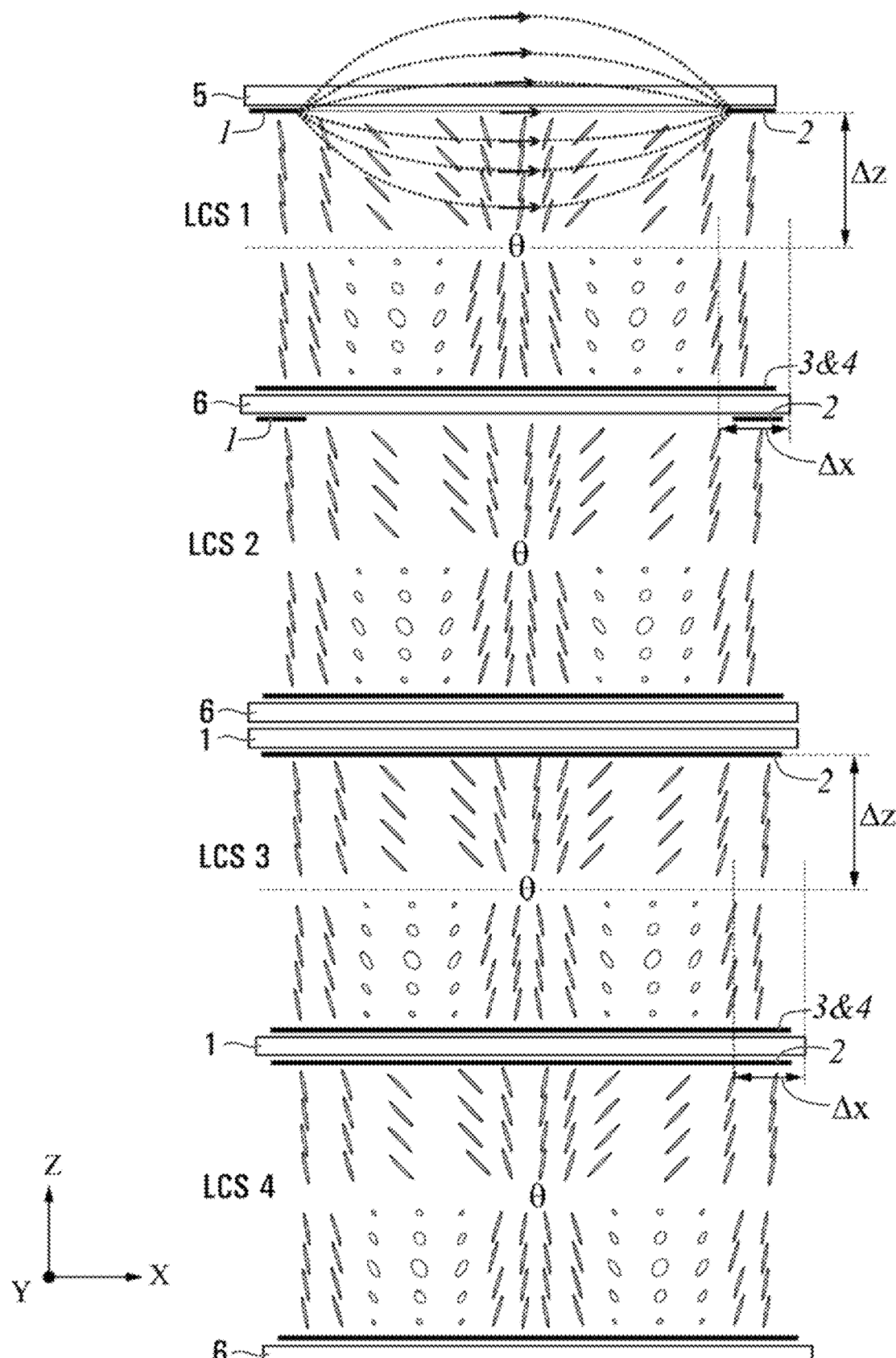
FIG. 14 is a schematic cross-sectional view of four LC sandwiches in which each sandwich has a homeotropic ground state LC alignment with the electrodes of the opposed cell substrates that are orthogonally arranged within each cell and in which there is a 45 degree rotation between the electrode orientation of the upper two sandwiches and the electrode orientation of the bottom two sandwiches.
Figure 15:
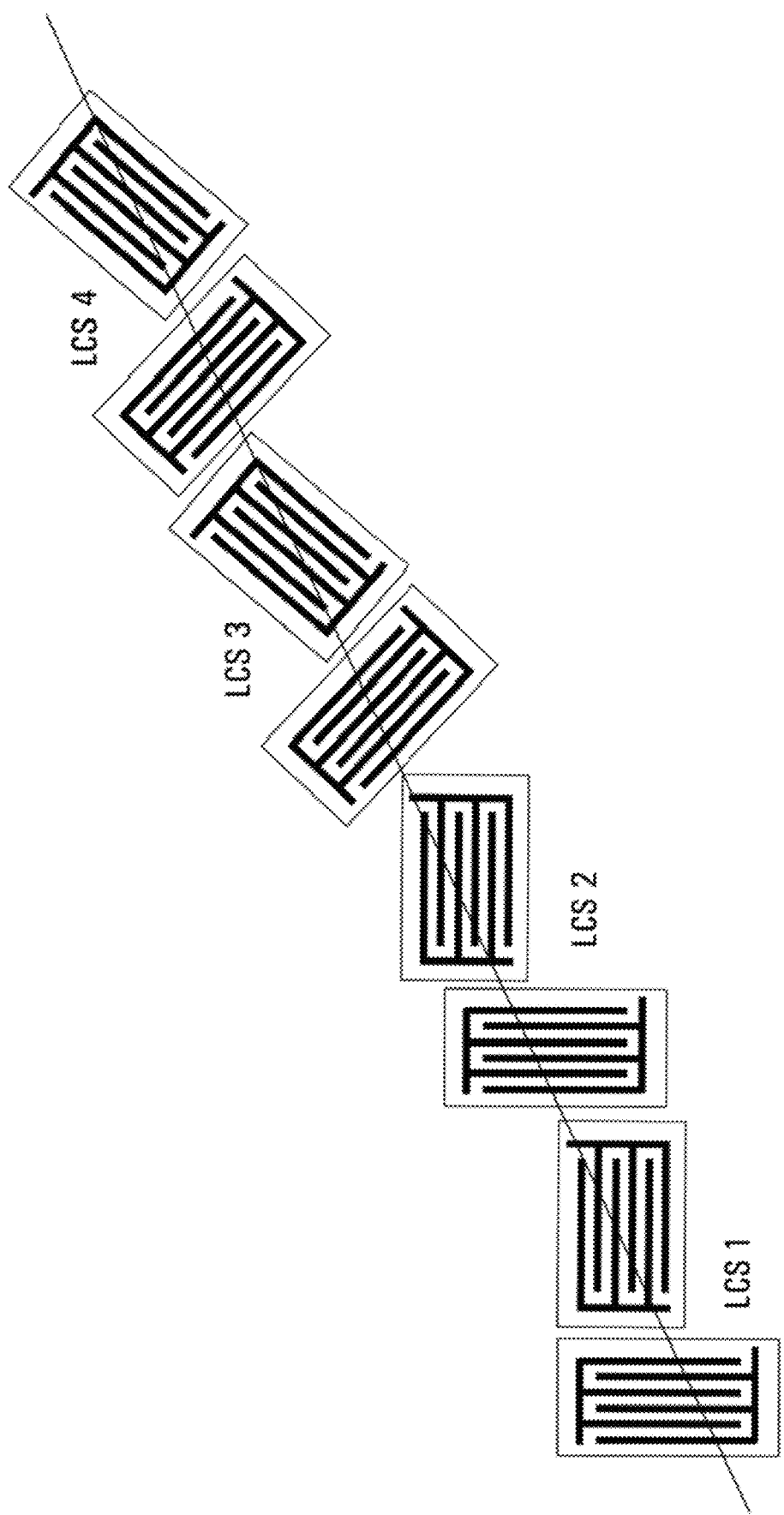
FIG. 15 is a schematic illustration of the electrode orientation of the four sandwiches according to FIG. 14.
Figure 16:
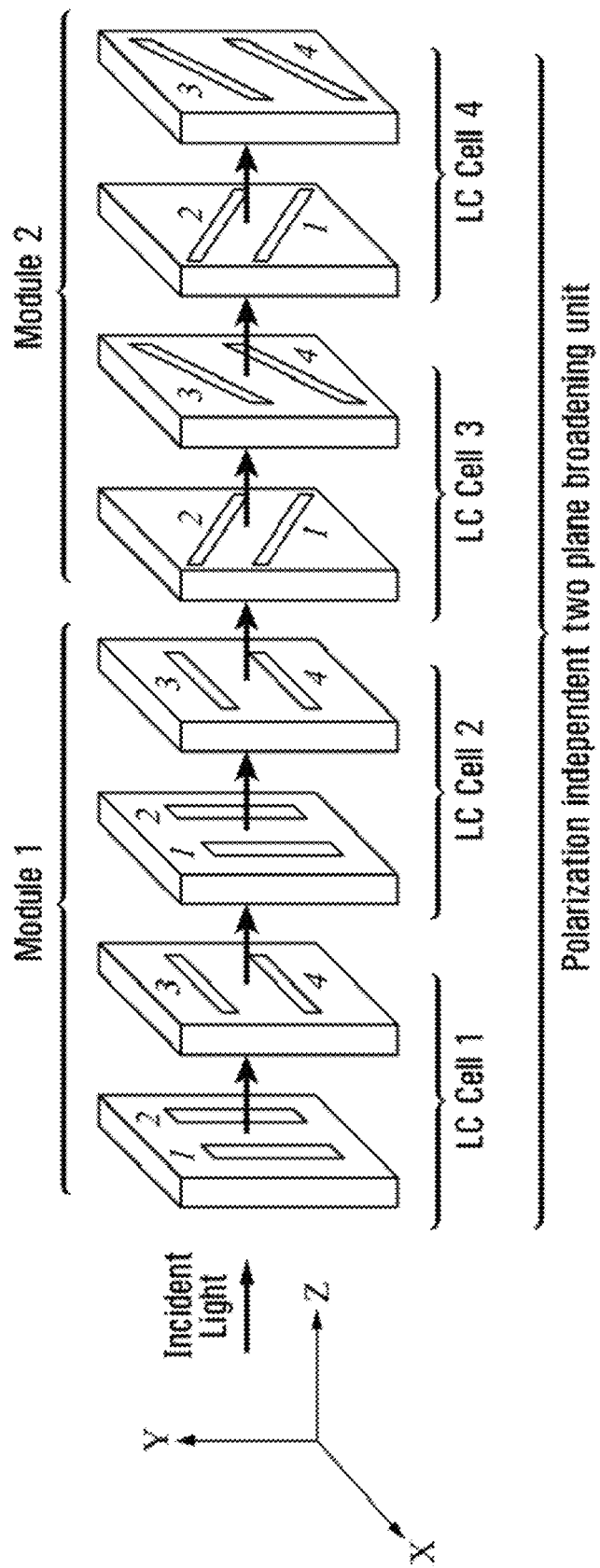
FIG. 16 is a schematic diagram according to FIG. 15 illustrating a polarization independent two (azimuthal) plane beam broadening device employing sequential beam broadening devices, such that the first orthogonal polarization directions affected by the first beam broadening device are oriented at about 45 degrees with respect to the second orthogonal polarization directions affected by the subsequent second beam broadening device.

The applicant has discovered that the intensity non-uniformity and color separation can become visible for light sources with very small divergence angle even if we use the above-mentioned modifications. The applicant found a way to mitigate this problem too. The embodiment of FIGS. 14 and 15 illustrate schematically a design in which four sandwiches of LC material having a homeotropic LC ground state and orthogonal electrodes on opposed substrates of each sandwich. As described with reference to FIG. 2A, two such sandwiches provide beam broadening in two directions, and the intensity uniformity of the beam broadening can be improved significantly using a small angle rotation between two sandwiches. Applicant has also found that an arrangement of four sandwiches (assembly of two pairs of sandwiches), wherein the first pair is composed of two sandwiches having electrodes that are either parallel or orthogonal to each other (whether or not a small angle offset is provided between the two sandwiches) and the second pair is composed of two sandwiches having electrodes that are oriented (rotationally offset) at approximately 45 degrees with respect to the first pair of sandwiches (whether or not a small angle offset is provided between the two sandwiches of the second pair) also improves beam intensity uniformity, as shown in FIG. 15 and FIG. 16. It will be appreciated that the ordering of sandwiches LCS1 to LCS4 can be varied from what is illustrated in FIG. 15 and FIG. 16.

Figure 17:
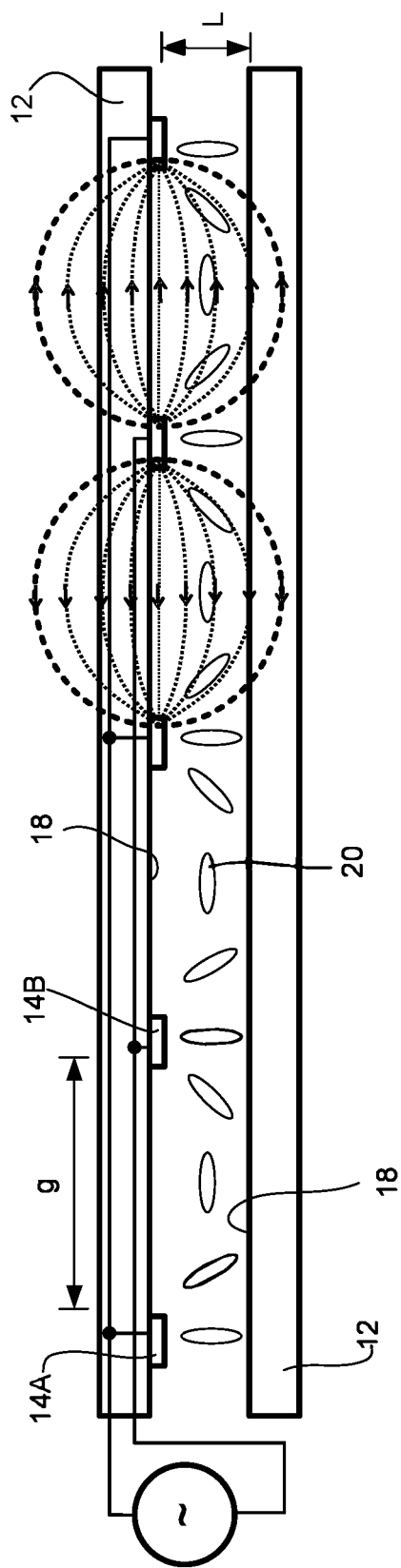
FIG. 17 is a schematic cross-section diagram illustrating a beam control optical device having four beam shaping elements in a liquid crystal cell, device which employs independent strip electrodes on one substrate of the cell to form an in-plane and fringe electric field between the electrodes.

FIG. 17 shows a beam control device having a single liquid crystal layer 20 that has, on one (top) substrate 12, independent electrodes 14A and 14B separated by gaps g to provide a control electric field between electrodes 14a and 14B that is spatially variable in the volume of liquid crystal material below each gap g. When a control signal having a voltage is applied across electrodes 14A and 14B in FIG. 17 (see the field lines illustrated on the two rightmost cells), the electric field follows a geometry oriented essentially parallel to the (separation) direction between the electrodes 14A and 14B at a midpoint of each gap g, while the orientation of the electric field lines turns to be essentially perpendicular to the (separation) direction between the electrodes 14A and 14B near (at) the edges of each gap g.

In FIG. 17, the aspect ratio (R) of the electrode spacing (g), or period between the electrodes 14A and 14B, and the thickness of the liquid crystal layer (L), R=g/L, can be, for example, between 0.7 and 4 (preferably about 2.5 for a microlens application) without using any weakly conductive material coating on or at the insulating substrate 12 on which the electrodes 14A and 14B are provided (located). For example, the electrode gap spacing g can be about 100 microns, while the LC layer thickness L can be about 50 microns for an aspect ratio of about 2. The width of the strip electrode 14A, 14B can be subtracted from the (step or) spacing g to obtain the aperture of an element. Surprisingly, the aspect ratio R has been found to play an important role in determining the desired electric field spatial variation as described above. The electrodes 14A and 14B are shown arranged on a LC cell inside side of the substrate 12, however, electrodes 14A and 14B can also be located on an outside side of the substrate 12. This latter arrangement may require a higher drive signal voltage, however, the electric field geometry can be better suited for modulating the electric field within the liquid crystal material volume for some applications.

Figure 18A:
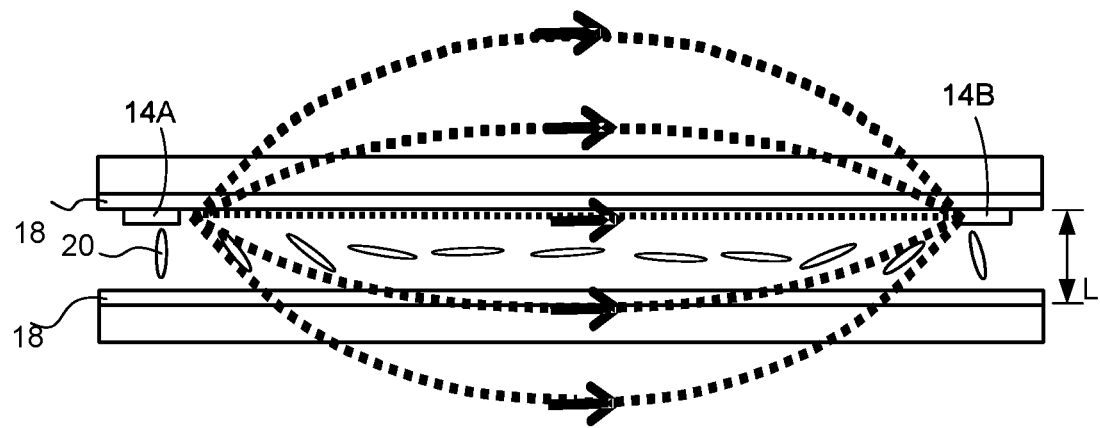
FIG. 18A is a schematic cross-section diagram illustrating an enlarged view of a variant of one beam shaping element of the device illustrated in FIG. 17 in which the aspect ratio of strip electrode separation gap to cell (gap) thickness is large.
Figure 18B:
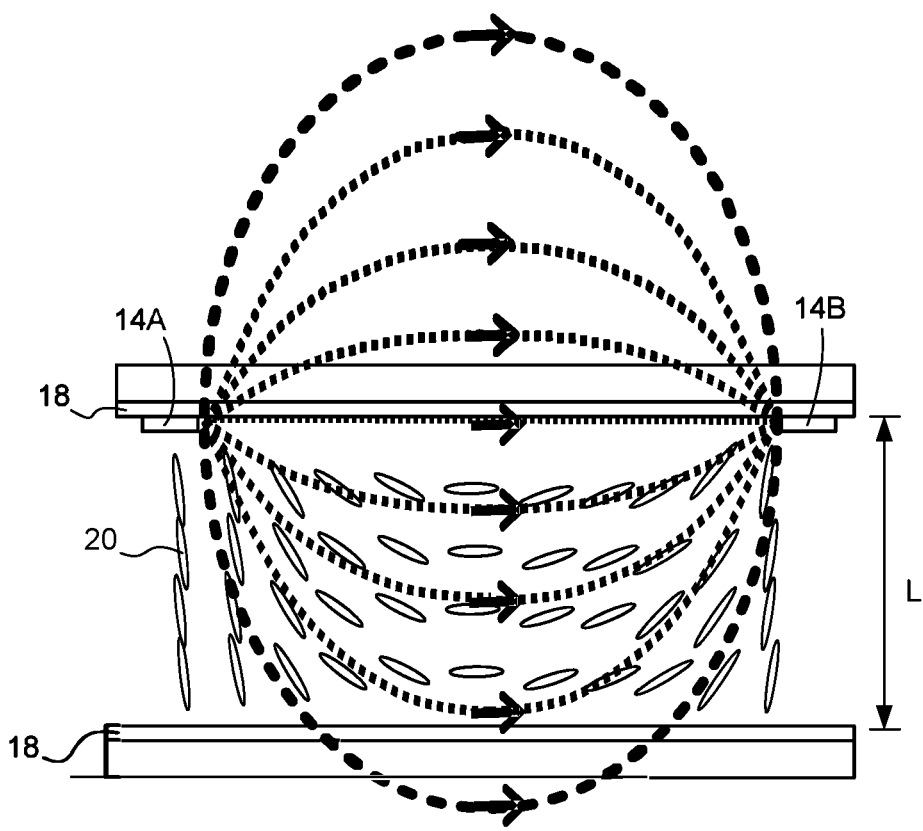
FIG. 18B is a schematic cross-section diagram illustrating an enlarged view of another variant of one beam shaping element of the device illustrated in FIG. 17 in which the aspect ratio of strip electrode separation gap to cell (gap) thickness is small.
Figure 18C:
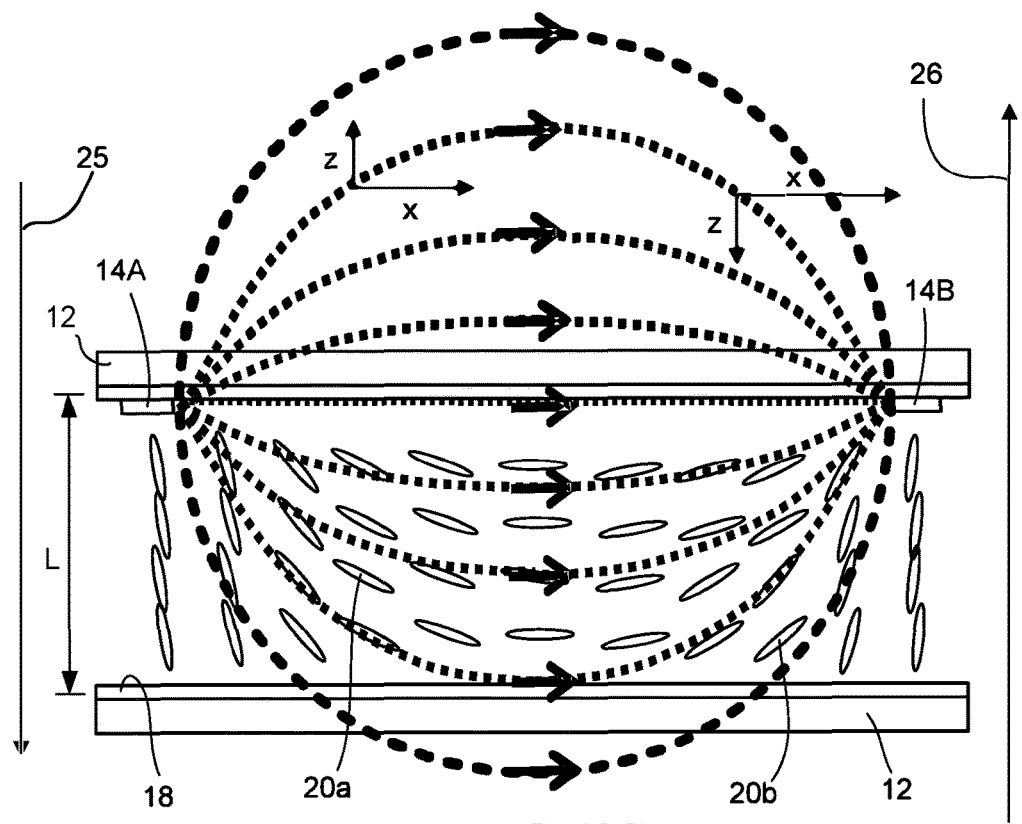
FIG. 18C is a schematic cross-section diagram illustrating an enlarged view of yet another variant of one beam shaping element of the device illustrated in FIG. 17 with an aspect ratio that is suitable for beam broadening in accordance with the proposed solution.

FIGS. 18A to 18C schematically illustrate in greater detail characteristics of the electric field generated from a single pair of parallel strip electrodes 14A and 14B similar to those of FIG. 17. FIG. 18A illustrates an aspect ratio R of about 10. The electric field lines in the cell are mostly parallel to the LC cell substrates except for fringe areas near the electrodes. This arrangement is known for use in displays where the liquid crystal needs to switch between two states, namely a ground state (e.g. twisted nematic or homeotropic) and a powered state in which the liquid crystal is aligned parallel to the substrates. The purpose for using such a control arrangement can be to provide a uniform reorientation of the liquid crystal material within the LC cell element between the electrodes 14A and 14B which is less suitable for beam shaping control applications such as beam broadening.

FIG. 18B schematically illustrates a LC cell element geometry in which the aspect ratio R is less than about 1. Such a small aspect ratio can for example be efficient for redirecting light from color pixels of a display so that chosen pixels become viewable from only a right eye or a left eye viewing angle for example in an autostereoscopic display. Various examples of such liquid crystal devices are described in US patent application publication 2010/0149444 to Hikmet et al. and in particular with reference to FIGS. 6A to 6D therein. The (initial/ground state) alignment of the liquid crystal material described in the Hikmet '444 reference is homeotropic. The intensity distribution as a function of viewing angle provides side-lobe peaks that can be suitable for autostereoscopic applications, however such a LC cell element geometry fails to provide (even) uniform intensity beam broadening suitable for a camera flash, architectural lighting and other illumination applications.

As will be appreciated from FIGS. 18A, 18B and 18C, the aspect ratio R has an influence (impact) on the spatial profile of the liquid crystal orientation within the LC cell, and an effective beam shaping optical device can be provided with a suitable aspect ratio R as illustrated in FIG. 18C, whereas optical devices illustrated in FIGS. 18A and 3B provide beam shaping that is not uniform. In accordance with the proposed solution, FIG. 18C illustrates a LC cell element geometry in which the aspect ratio R is greater than about 1 and less than about 4.5.

Figure 18D:
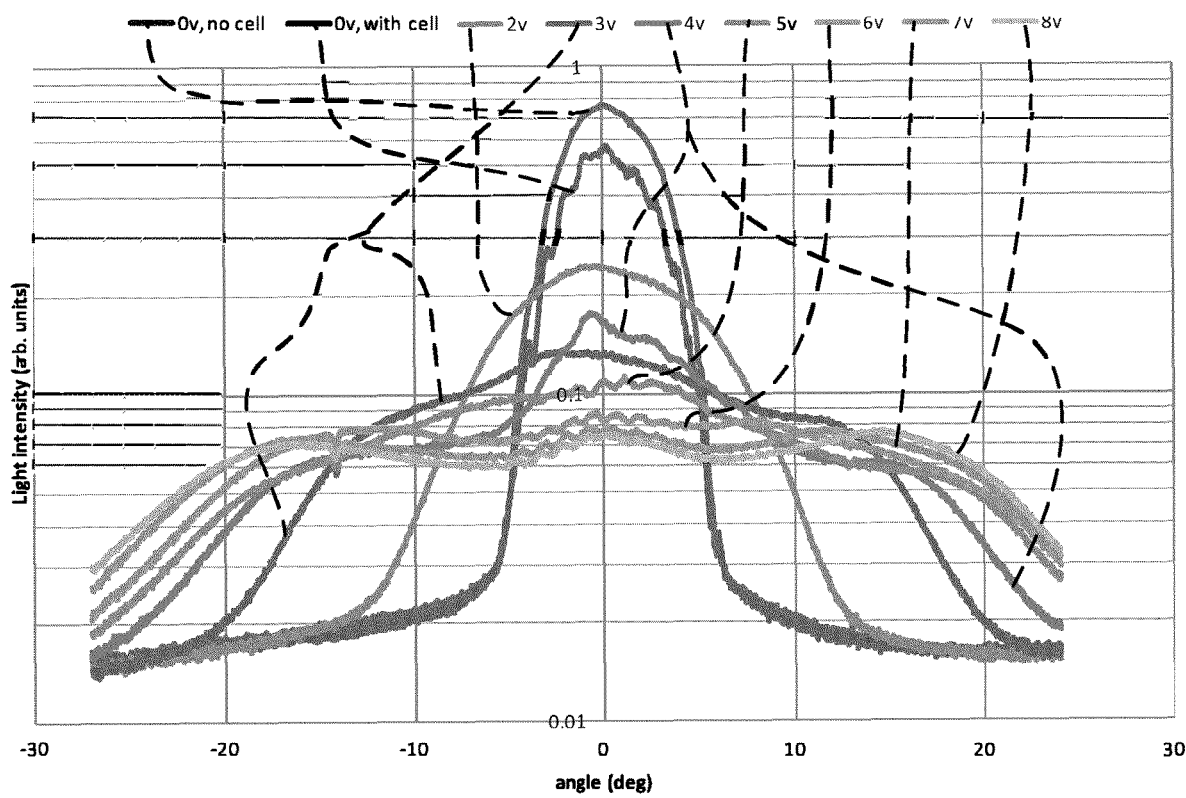
FIG. 18D is a schematic plot of experimentally measured beam intensity as a function of projection angle for the same input beam with: no device, and then with the cell of the device operating at 0V, 2V, 3 V, 4V, 5V, 6V, 7V and 8V, from which it can be seen that an appropriately (pre)selected (liquid crystal in-plane alignment and) aspect ratio for the cell of FIG. 18C can provide (even) beam broadening at low voltage having an improved beam intensity uniformity in accordance with the proposed solution.

The experimental LC cell characterized in FIG. 18D has an electrode gap g of about 75 microns, electrode 14A, 14B width of about 15 microns and a liquid crystal layer thickness L of about 60 microns. This provides an aspect ratio of about 1.5. As shown in FIG. 18D, experimental results show that the intensity of a light beam propagating through a beam control device configured as illustrated in FIG. 18C, an (uncollimated/slightly divergent) incident beam having initially an angular distribution of +/−5 degrees (FWHM) about the normal can be broadened (further spread) to have substantially a uniform intensity (shown plotted on a log scale) with an angular distribution of about +/−20 degrees FWHM about the normal using a control signal voltage of about 5V to 8V. The beam is broadened from a beam having an angular distribution (divergence) of about +/−5 degrees FWHM to a FWHM range of +/−12 degrees to +/−25 degrees. By "substantially uniform intensity", it can be understood that the beam's angular distribution is free of perceptible "hot spot(s)", namely projected regions that appear particularly brighter than others. At higher control signal voltages, the intensity at 15 degrees FWHM increases to be a bit greater than for 8 FWHM degrees, however, the formation of pronounced side lobes is avoided.

In the embodiment illustrated in FIGS. 17 and 18C, the electric field has components that are "vertical" ("out of plane"), namely perpendicular to the substrate 12 at which the electrodes 14A and 14B are located, and "horizontal", namely extending between the electrodes 14A, 14B parallel to the cell substrates 12 (in the electrode gaps).

When the liquid crystal material is oriented in its ground state by an alignment layer 18 defining a pretilt angle that provides initial (preferential) in-plane molecular orientation extending (in the direction) between the electrodes 14A and 14B (perpendicular to the electrode strips), an asymmetry is expressed (occurs in) the output broadened beam intensity due to the pretilt angle. The pretilt angle of the alignment layer 18 generates an asymmetric local orientation difference between the electric field and the desired spatial distribution of orientation of the liquid crystal in the LC cell. As illustrated in FIG. 18C, the left side orientation of liquid crystal at 20a is aligned with the electric field, while the right side orientation of the liquid crystal at 20b is likewise aligned in the opposed direction with the field, however with a planar alignment of the liquid crystal in the ground state, some asymmetric variation will occur.

The strip electrodes 14A and 14B can be sufficiently narrow enough so as to reduce the size of the boundary zone between adjacent cells. The overall device aperture having a LC cell illustrated in FIG. 18C can have many such (cells) control elements, whether arranged in strips, rings, spirals or other geometric patterns, for a small electrode gap g of each control element (cell) of about 30 microns to about 90 microns, and typically around 50 microns, about 20 control elements (cells) per linear millimeter of aperture can be provided.

Figure 20A:
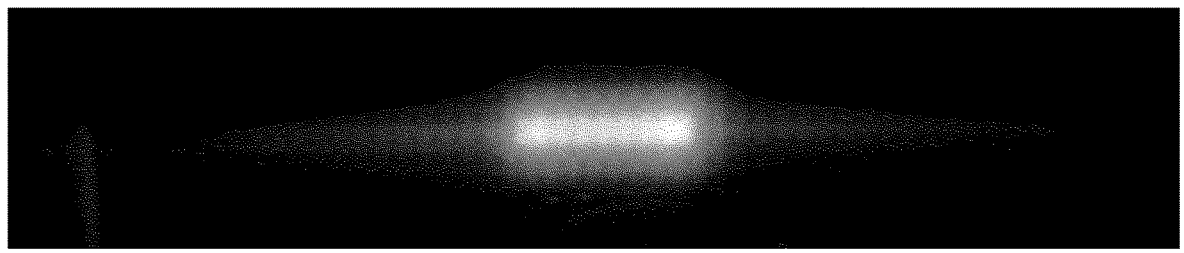
FIG. 20A is a schematic illustration of a projection of an output beam broadened using a device having a cell layered geometry according to FIG. 18C with the incident beam propagating through the device in the direction shown by arrow 26 in FIG. 18C, illustration showing a first amount of beam broadening in accordance with the proposed solution.
Figure 20B:
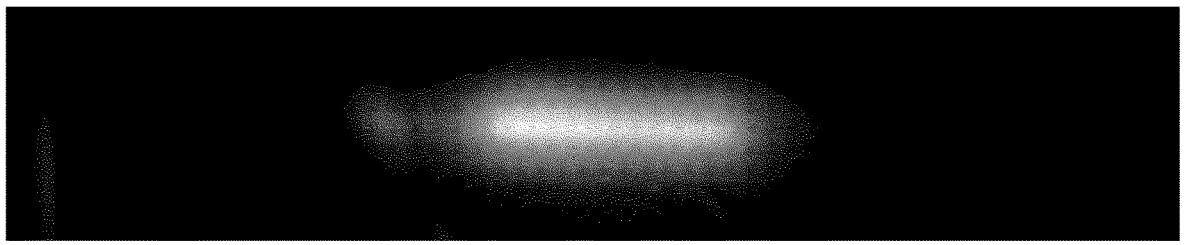
FIG. 20B is a schematic illustration of a projection of an output beam broadened using a device having a cell layered geometry according to FIG. 18C with the incident beam propagating through the device in the direction shown by arrow 25 in FIG. 18C, illustration showing a second amount of beam broadening in accordance with the proposed solution.

FIGS. 20A and 20B show projected images of the same incident beam broadened by a beam broadening device having a patterned electrode structure with a large number of interdigitating (finger) strip electrodes and therefore a large number of control elements, control elements which have a suitable aspect ratio R as illustrated in FIG. 18C. The projected beam intensity distributions shown in FIGS. 20A and 20B correspond to light beam propagation traversing the LC cell in direction 26 and 25 respectively (see FIG. 18C). As can be seen, Applicant has discovered that the incident beam is broadened significantly more when propagating in direction 25 than when propagating in direction 26. It has also been observed that when the liquid crystal orientation is of different in-plane orientation, such as twisted nematic and pi-cell, the same preferential effect for the propagation direction 25 over propagation direction 26 is present. Some of these discovered effects can be understood with reference to FIG. 18C wherein the electric field is not only variable with depth (L) within the LC cell volume but the electric field lines also have a differing curvature which also varies with depth within the LC cell volume. An incident beam of light propagating in direction 25 experiences first a strong electric field having electric field lines of low curvature and progressively experiences a weak electric field having electric field lines of high curvature. Conversely, an incident beam of light propagating in direction 26 experiences first a weak electric field having electric field lines of high curvature and progressively experiences a strong electric field having electric field lines of low curvature. With LC molecular axes being reoriented by electric field lines and local extraordinary ray refraction within the LC material being enhanced with depth of propagation, the graded index variation experienced by each ray can have a different influence depending on propagation direction. It is surprising that such property variations express large measurable output beam variations.

It has also been observed that for homeotropic liquid crystal orientation in the ground state, namely for high pretilt angles close to parallel to the normal, dynamic beam broadening can be improved for direction 26 over direction 25. It is surprising that such effects express large measurable variations.

The result of a liquid crystal ground state orientation being in a direction extending between the electrodes 14A and 14B can be an asymmetry of director reorientation profile and/or generate a disclination in response to the electric field. In addition, the chromatic dispersion of the created microlenses becomes rather large. These problems may produce a visible distortion in the transmitted light. For example, FIG. 20C demonstrates a color separation effect that was produced using a multi-finger strip electrode arrangement as per FIG. 17 receiving a collimated incident light beam. As can be seen, the broadening is not centro-symmetric, the broadening angle is modest, there are bright spots at the edges and there is chromatic dispersion generating the visible color separation.

Figure 19:
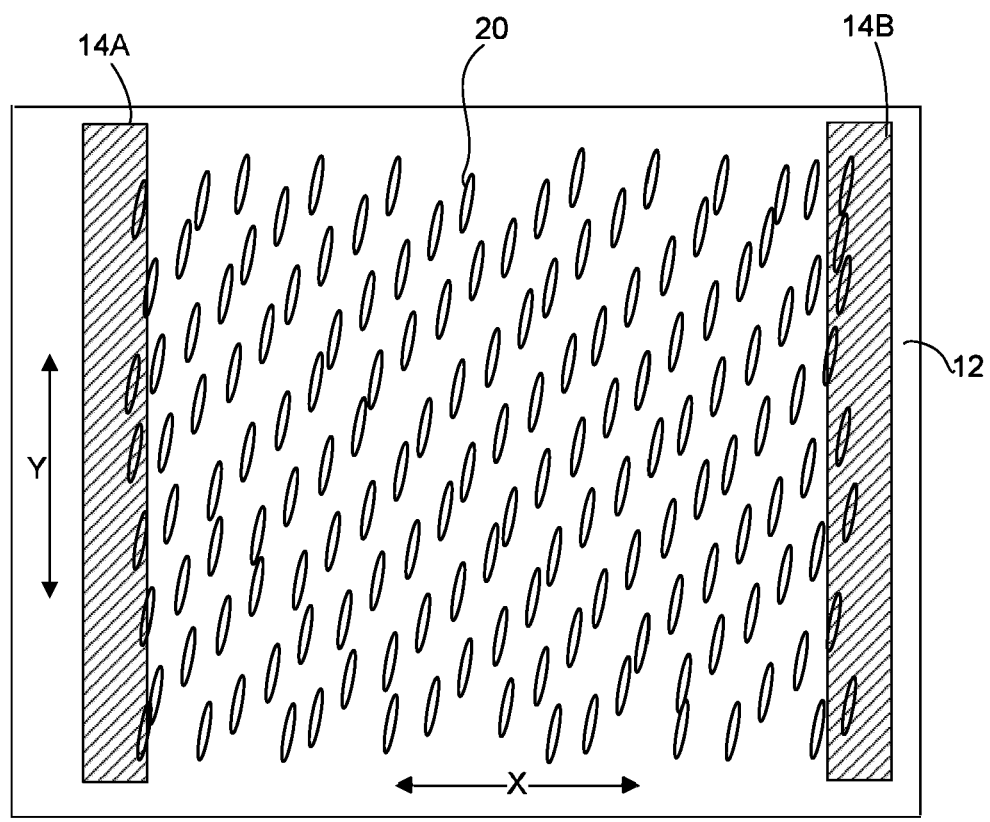
FIG. 19 is a schematic diagram illustrating a plan view of a beam control element according to FIG. 18C in which in-plane liquid crystal alignment is substantially parallel to the strip electrodes in accordance with the proposed solution.
Figure 20C:
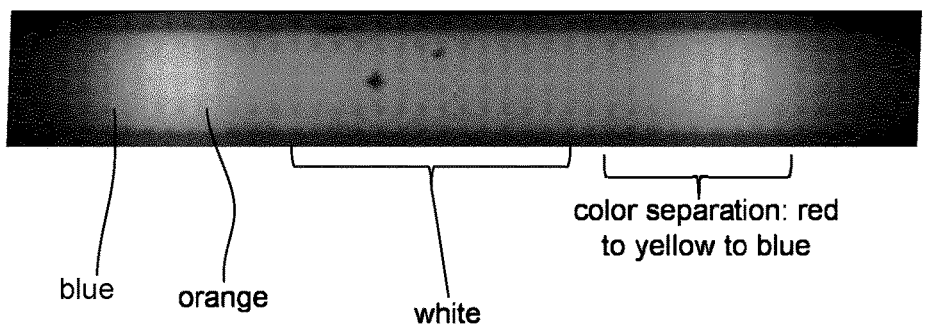
FIG. 20C is an image, and corresponding schematic color diagram inset, illustrating the projection of a beam broadened using a beam control device having a layered cell geometry according to FIG. 17, the image showing observed color separation.
Figure 20D:
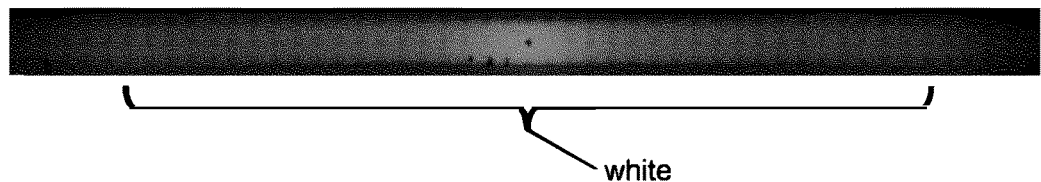
FIG. 20D is an image, and corresponding schematic color diagram inset, illustrating the projection of a beam broadened using a beam control device having a layered cell geometry according to FIG. 19, the image showing reduced color separation in accordance with the proposed solution.

In FIG. 19, schematically illustrates in plan view an alternate configuration in which the (in-plane) orientation of the alignment layer 18 is almost parallel of the strip electrodes 14A and 14B. In this configuration, the electric field component in the (horizontal) X direction would act on the LC molecules to turn them sideways against the (restorative orienting) action of the alignment layer 18. However, the (vertical) or Y direction component of the electric field acts on the liquid crystal molecules 20 with good symmetry across the gap. This configuration provides good beam broadening symmetry, as illustrated in FIG. 20D. As shown, there is little or no chromatic dispersion and the intensity distribution is desirably broad and smooth (with good uniformity).

Orienting the liquid crystal material in the manner shown in FIG. 19 provides a reduction in color separation for one light polarization, but not for the other light polarization (without employing a polarization rotation device). Thus the problem illustrated in FIG. 20C cannot be simply resolved in the manner shown in FIG. 19 for both polarizations.

Figure 21:
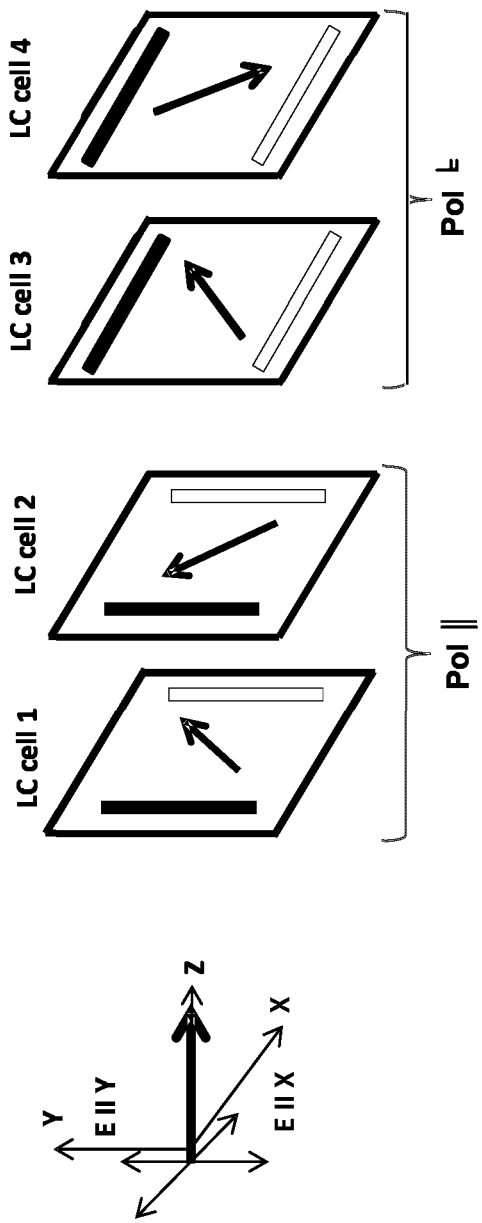
FIG. 21 is a schematic diagram illustrating a beam control device having four LC cells arranged to provide dual polarization operation and two direction (along two azimuthal planes) beam control, configuration in which the in-plane liquid crystal orientation is substantially arranged at ±45 degrees to the orientation of the strip electrodes in accordance with the proposed solution.

In accordance with an embodiment of the proposed solution the in-plane alignment orientation of the liquid crystal can be provided at roughly a 45 degree angle to the direction of the electrodes 14A and 14B, such a geometry allows the same compromise to be employed for each of the two light (linear) polarization components. Such a layered geometry is schematically illustrated in FIG. 21 for beam control for two directions (azimuthal planes) and for both polarizations. While the chromatic aberration or color separation reduction is not as good as in the embodiment illustrated in FIG. 19, for the embodiment illustrated in FIG. 21, when the direction of alignment is at 45 degrees with respect to the direction of the strip electrodes 14A and 14B, the problem of color separation shown in FIG. 20C is greatly reduced.

Figure 22:
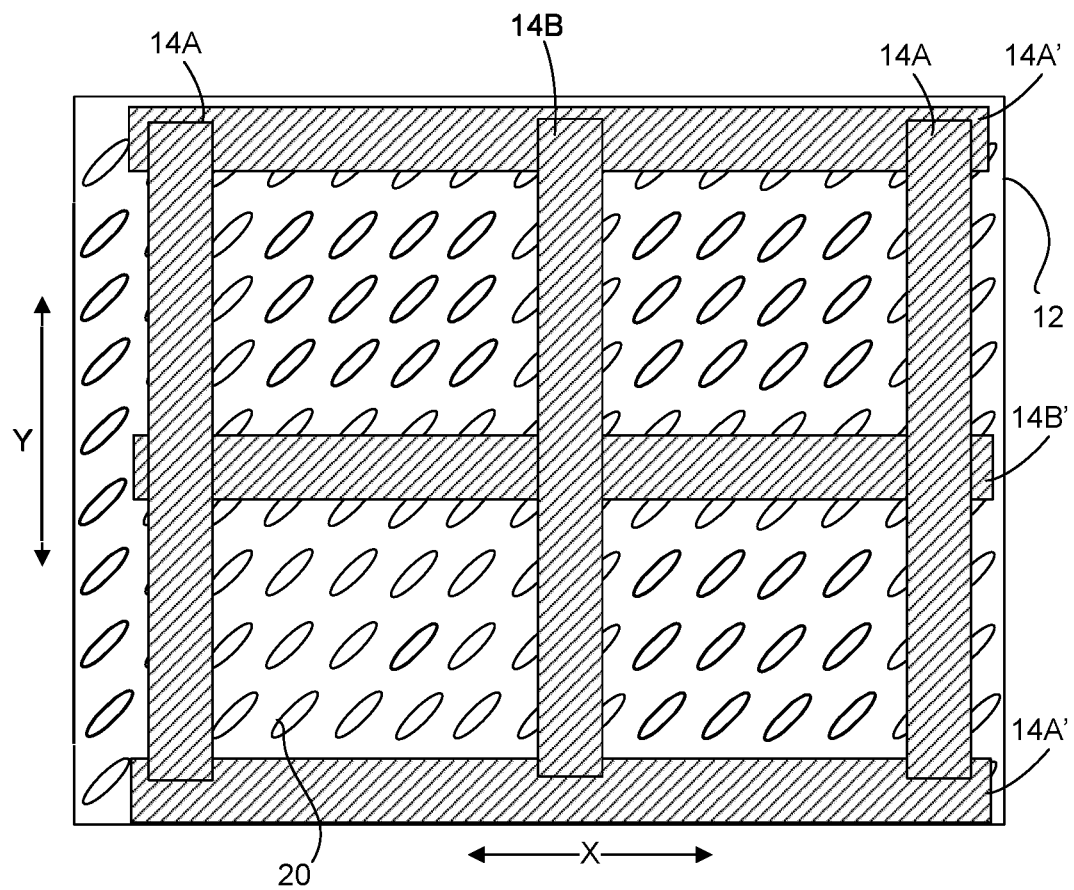
FIG. 22 is a schematic diagram illustrating in plan view four beam control elements having orthogonally arranged and electrically isolated strip electrodes according to FIG. 18C in which (in plane) liquid crystal alignment is substantially at 45 degrees to the strip electrodes in accordance with the proposed solution.

FIG. 22 illustrates a variant embodiment in which the nematic liquid crystal is aligned in the ground state using rubbed surfaces at a 45 degree angle to the electrodes 14A and 14B. In this embodiment, as illustrated, electrode strips 14 A' and 14B' can also be arranged orthogonally to electrode strips 14A and 14B, and the direction of rubbing is also at 45 degrees to electrode strips 14 A' and 14B'. Electrode strips 14 A' and 14B' are electrically insulated using an insulation layer from electrode strips 14A and 14B. This arrangement allows for beam shaping in the X direction and/or in the Y direction. Without any such insulation, a hole-patterned electrode mask could be used for combined X+Y direction beam shaping when an opposed electrode is provided. The device illustrated in FIG. 22 has a single layer of liquid crystal material and modulates a single (linear) polarization of light in two perpendicular azimuthal planes. An additional, orthogonally oriented layer of liquid crystal is required to modulate both light polarization components.

The orthogonal electrode configuration of FIG. 22 can provide independent directional control over beam shaping, while simplifying manufacturing. A double lithography process can be used to create (consecutively) crossed pairs of electrodes on the same substrate (separated by an isolation layer), as schematically shown in FIG. 22. This can avoid alignment problems otherwise occurring during assembly of devices when the control electrodes for each beam control direction are provided on their own substrate.

Experimental results using a four LC cell device as schematically illustrated in FIG. 21 (having patterned electrodes of many parallel fingers 14A, 14B as described with reference to FIGS. 17 and 18C) were obtained for different voltages and liquid crystal ground state orientations. The electrode strip width was 15 microns, the gap g between electrodes was 75 microns, the thickness of the liquid crystal layer L was 60 microns, and the liquid crystal material had an optical anisotropy of Δη of about 0.2. No opposed ground electrode was used in the experimental device, employing electric fields schematically represented in FIG. 18C.

Beam broadening in this experimental setup became quite uniform (even) and well distributed at 7V, whereas for lower control signal voltages, the amount of beam broadening was reduced. Observed beam broadening was not symmetrical with respect to the optical axis due to the 45 degree ground state in-plane orientation angle. It has been found that this lack of symmetry is reduced for smaller aspect ratios R that are still suitable for beam control, as discussed above with reference to FIGS. 18A to 18C.

While the invention has been illustrated and described with reference to preferred embodiments thereof, it will be recognized by those skilled in the art that various changes in form and detail may be made therein without departing from the spirit and scope of the invention as defined by the appended claims.

What is claimed is:

1. A beam control device for shaping an output light beam, the beam control device being configured to receive an incident beam from a light source, the beam control device comprising:
    at least one liquid crystal cell for modulating said incident beam as said incident beam propagates therethrough, each liquid crystal cell having: a pair of cell substrates separated by a cell thickness, a liquid crystal material filling, at least one alignment layer for ordering said liquid crystal material with a director in a ground state alignment direction, a patterned electrode structure having a pattern of paired strip electrodes on one of said pair of substrates, and a power circuitry providing a zero voltage electrical signal for providing an unpowered mode and at least one electric signal for powering said paired strip electrodes for providing at least a powered mode to generate a spatially modulated electric field extending between said paired strip electrodes and into said liquid crystal material, said liquid crystal cell having a predetermined aspect ratio between an electrode spacing gap between said paired electrodes and said cell thickness,
    wherein said alignment layer provides, in said unpowered mode, a mostly homogeneous in-plane ground state liquid crystal alignment having an initial alignment direction of about 45 degrees, with respect to a length direction of said electrodes, and
    wherein, in said powered mode, an azimuthal component of a local realignment direction of said liquid crystal material spatially realigned by said modulated electrical field has an orientation of about 90 degrees with respect to said length direction of said electrodes, and an elevation component of said local realignment direction follows said spatially modulated electric field.

2. A beam control device as defined in claim 1, wherein said aspect ratio of said electrode spacing gap to said cell thickness is between about 0.8 and about 1.3.

3. A beam control device as defined in claim 1, wherein electrode spacing gap is one of substantially constant and chirped such that said aspect ratio of said electrode spacing gap to said cell thickness is between about 0.8 and about 1.3.

4. A beam control device as defined in claim 1, wherein said initial beam has a FWHM divergence of about ±5 degrees FWHM and said modulated beam has a FWHM divergence of about +/−30 degrees FWHM, said predetermined drive signal having a voltage less than 10V, and said good uniformity of said output beam including an intensity of said modulated beam as a function of angle varying less than 40% over about +/−30 degrees FWHM.

5. A beam control device as defined in claim 1, further comprising a drive signal source for generating said predetermined drive signal, said drive signal source being configured to provide a variable control over beam divergence.

6. A beam control device as defined claim 5, wherein said beam control device is configured to control beam direction or divergence in one azimuthal plane.

7. A beam control device as defined in claim 5, wherein beam control device is configured to control beam directions or divergence in two azimuthal planes.

8. A beam control device as defined in claim 1, comprising two of said liquid crystal cell having liquid crystal for shaping light in two azimuthal planes and of a first and a second linear polarization, wherein said two liquid crystal cells are arranged so as to have their patterned electrode structures offset with respect to one another so that transition portions of a first zone and a second zone of one of said two liquid crystal cells do not register with transition portions of said first and said second zones of another of said two liquid crystal cells.

9. A beam control device as defined in claim 1, wherein said electrode spacing gap is defined by a first one of the paired electrodes and a second one of the paired electrodes.

10. A beam control device as defined in claim 1, wherein said alignment layer provides in-plane liquid crystal alignment having an alignment direction that provides color separation reduction in a first and a second linear polarization of the incident beam relative to a color separation resulting from an alignment layer providing in-plane liquid crystal alignment having an alignment direction that is perpendicular to said paired electrodes.

11. A beam control device for shaping an output light beam, the beam control device being configured to receive an incident beam from a light source, the beam control device comprising:
    at least one liquid crystal cell for modulating said incident beam as said incident beam propagates therethrough, each liquid crystal cell having: a pair of cell substrates separated by a cell thickness, a liquid crystal material filling, at least one alignment layer for ordering said liquid crystal material with a director in a ground state alignment direction, and a patterned electrode structure having a pattern of paired electrodes on at least one of said pair of substrates for providing a spatially modulated electric field extending into said liquid crystal material, said liquid crystal cell having a predetermined aspect ratio between an electrode spacing gap between said paired electrodes and said cell thickness;
    wherein:
        said alignment layer provides in-plane liquid crystal alignment, and
        said electrode pattern comprises concentric rings, and further comprising a complementary orthogonal electrode pattern of radially extending electrode pairs.

12. A beam control device for shaping an output light beam, the beam control device being configured to receive an incident beam from a light source, the beam control device comprising:
    at least one liquid crystal cell for modulating said incident beam as said incident beam propagates therethrough, each liquid crystal cell having: a pair of cell substrates separated by a cell thickness, a liquid crystal material filling, at least one alignment layer for ordering said liquid crystal material with a director in a ground state alignment direction, a patterned electrode structure having a pattern of paired strip electrodes on one of said pair of substrates, and a power circuitry providing a zero voltage electrical signal for providing an unpowered mode and at least one electric signal for powering said paired strip electrodes for providing at least a powered mode to generate a spatially modulated electric field extending between said paired strip electrodes and into said liquid crystal material, said liquid crystal cell having a predetermined aspect ratio between an electrode spacing gap between said paired electrodes and said cell thickness, wherein said alignment layer provides, in said unpowered mode, a mostly homogeneous in-plane ground state liquid crystal alignment having an initial alignment direction of about 45 degrees, with respect to a length direction of said electrodes, wherein, in said powered mode, an azimuthal component of a local realignment direction of said liquid crystal material spatially realigned by said modulated electrical field has an orientation of about 90 degrees with respect to said length direction of said electrodes, and an elevation component of said local realignment direction follows said spatially modulated electric field, and wherein four of said liquid crystal cells are combined to provide modulation of said first and said second linear polarization and in two directions or azimuthal planes.

13. A beam control device as defined in claim 12, wherein said aspect ratio of said electrode spacing gap to said cell thickness is between about 0.8 and about 1.3.

14. A beam control device as defined in claim 12, wherein electrode spacing gap is one of substantially constant and chirped such that said aspect ratio of said electrode spacing gap to said cell thickness is between about 0.8 and about 1.3.

15. A beam control device as defined in claim 12, wherein said initial bean, has a FWHM divergence of about ±5 degrees FWHM and said modulated beam has a FWHM divergence of about +/−30 degrees FWHM, said predetermined drive signal having a voltage less than 10V, and said good uniformity of said output beam including an intensity of said modulated beam as a function of angle varying less than 40% over about +/−30 degrees FWHM.

16. A beam control device as defined in claim 12, further comprising a drive signal source for generating said predetermined drive signal, said drive signal source being configured to provide a variable control over beam divergence.

17. A beam control device as defined in claim 16, wherein beam control device is configured to control beam directions or divergence in two azimuthal planes.

18. A beam control device as defined in claim 12, wherein said electrode spacing gap is defined by a first one of the paired electrodes and a second one of the paired electrodes.

19. A beam control device as defined in claim 12, wherein said alignment layer provides in-plane liquid crystal alignment having an alignment direction that provides color separation reduction in a first and a second linear polarization of the incident beam relative to a color separation resulting from an alignment layer providing in-plane liquid crystal alignment having an alignment direction that is perpendicular to said paired electrodes.

20. A beam control device for shaping an output light beam, the beam control device being configured to receive an incident beam from a light source, the beam control device comprising:

at least one liquid crystal cell for modulating said incident beam as said incident beam propagates therethrough, each liquid crystal cell having: a pair of cell substrates separated by a cell thickness, a liquid crystal material filling, at least one alignment layer for ordering said liquid crystal material with a director in a ground state alignment direction, and a patterned electrode structure having a pattern of paired electrodes on at least one of said pair of substrates for providing a spatially modulated electric field extending into said liquid crystal material, said liquid crystal cell having a predetermined aspect ratio between an electrode spacing gap between said paired electrodes and said cell thickness;

wherein said alignment layer provides in-plane liquid crystal alignment, and four of said liquid crystal cells are combined to provide modulation of a first and a second linear polarization and in two directions or azimuthal planes, and wherein said electrode pattern comprises concentric rings, and further comprising a complementary orthogonal electrode pattern of radially extending electrode pairs.

\* \* \* \* \*